(12) United States Patent
Lenke et al.

(10) Patent No.: US 12,705,019 B2
(45) **Date of Patent: *Aug. 11, 2026**

(54) AUTOMOTIVE INFOTAINMENT SYSTEM WITH SPATIALLY-COGNIZANT APPLICATIONS THAT INTERACT WITH A SPEECH INTERFACE

(71) Applicant: Cerence Operating Company, Burlington, MA (US)

(72) Inventors: Nils Lenke, Aachen (DE); Prasad Mandge, Pune (IN); Ketan Kankapure, Pune (IN); Aditya Chauhan, Pune (IN); Duygu Kanver, Farmington Hills, MI (US); Christian Benien, Aachen (DE); Kalpeshkumar Bhanubhai Patel, Pune (IN); Marina Matveevskaia, Aachen (DE); Abbas Ali Vanak, Issaquah, WA (US)

(73) Assignee: Cerence Operating Company, Burlington, MA (US)

( * ) Notice: Subject to any disclaimer, the term of this patent is extended or adjusted under 35 U.S.C. 154(b) by 158 days.

This patent is subject to a terminal disclaimer.

(21) Appl. No.: 18/828,120

(22) Filed: Sep. 9, 2024

(65) Prior Publication Data

US 2025/0068384 A1 Feb. 27, 2025

Related U.S. Application Data

(62) Division of application No. 17/539,508, filed on Dec. 1, 2021, now Pat. No. 12,086,501.

(Continued)

(51) Int. Cl.

*G06F 3/16* (2006.01)
*G01C 21/36* (2006.01)
*G10L 15/18* (2013.01)

(52) U.S. Cl.

CPC ......... *G06F 3/165* (2013.01); *G01C 21/3629* (2013.01); *G10L 15/18* (2013.01)

(58) Field of Classification Search

CPC ......... G10L 15/22; G10L 15/08; H04R 1/406; H04R 3/005; G01C 21/3629; G06F 3/165

See application file for complete search history.

(56) References Cited

U.S. PATENT DOCUMENTS 5,055,939 A 10/1991 Karamon et al.
6,243,683 B1 6/2001 Peters (Continued)

FOREIGN PATENT DOCUMENTS

AU 2005292243 A1 * 4/2006 ......... G01C 21/3629
AU 2008357168 A1 * 12/2009 ......... G01C 21/3638

(Continued)

OTHER PUBLICATIONS

Algorithm for Genrerating and Visualizing Routes of an Intelligent Tourist Guide (Year: 2020).*

(Continued)

*Primary Examiner* — Mohammad K Islam
(74) *Attorney, Agent, or Firm* — Burr & Forman

(57) ABSTRACT

An automotive processing unit includes an infotainment system having a speech interface, an application suite comprising one or more spatially-cognizant applications, and an automotive assistant that is configured to execute one or more of the spatially-cognizant applications. The speech interface is configured to receive a navigation announcement from a navigator and a touring announcement from one of the spatially-cognizant applications and, in response, to cause a spoken announcement to be made audible in a vehicle's cabin through a loudspeaker. The spoken announcement comprising content from at least one of the touring announcement and the navigation announcement.

16 Claims, 15 Drawing Sheets

Related U.S. Application Data

(60) Provisional application No. 63/147,991, filed on Feb. 10, 2021, provisional application No. 63/123,119, filed on Dec. 9, 2020, provisional application No. 63/123,110, filed on Dec. 9, 2020, provisional application No. 63/123,114, filed on Dec. 9, 2020.

(56) References Cited

U.S. PATENT DOCUMENTS 6,567,775 B1 5/2003 Maali et al.
7,472,063 B2 12/2008 Nefian et al.
7,957,542 B2 6/2011 Sarrukh et al.
8,700,392 B1 4/2014 Hart et al.
8,913,103 B1 12/2014 Sargin et al.
9,832,583 B2 11/2017 Cohen et al.
9,881,610 B2 1/2018 Connell, II et al.
9,922,646 B1 3/2018 Blanksteen
10,154,361 B2 12/2018 Tammi et al.
10,332,515 B2 6/2019 Kim et al.
10,374,816 B1 8/2019 Leblang et al.
11,789,457 B1* 10/2023 Woo ........................ H04R 3/005 700/253
12,125,393 B2* 10/2024 Sahoo ..................... H04W 4/42
2003/0009281 A1* 1/2003 Whitham ............. G01C 21/343 340/988
2004/0220705 A1 11/2004 Basir et al.
2009/0015651 A1 1/2009 Togami et al.
2009/0055180 A1 2/2009 Coon et al.
2009/0150149 A1 6/2009 Culter et al.
2010/0194863 A1 8/2010 Lopes et al.
2010/0265164 A1 10/2010 Okuno
2011/0224978 A1 9/2011 Sawada
2012/0069131 A1 3/2012 Abelow
2013/0030811 A1 1/2013 Olleon et al.
2013/0169801 A1 7/2013 Martin et al.
2014/0187219 A1 7/2014 Yang et al.
2014/0214424 A1 7/2014 Wang et al.
2014/0365228 A1* 12/2014 Ng-Thow-Hing ...... G06F 3/017 704/275
2014/0372100 A1 12/2014 Jeong et al.
2015/0023256 A1* 1/2015 Liu ......................... H04L 51/58 370/329
2015/0058004 A1 2/2015 Dimitriadis et al.
2015/0112593 A1* 4/2015 Kandangath ....... G01C 21/3644 701/400
2015/0139426 A1 5/2015 Tammi et al.
2015/0154957 A1 6/2015 Nakadai et al.
2015/0254058 A1 9/2015 Klein et al.
2015/0324636 A1 11/2015 Bentley et al.
2015/0340040 A1 11/2015 Mun et al.
2016/0006400 A1 1/2016 Mu
2016/0100092 A1 4/2016 Bohac
2016/0140964 A1 5/2016 Connell, II et al.
2016/0358604 A1 12/2016 Dreuw
2017/0113627 A1 4/2017 Ding
2017/0133036 A1 5/2017 Cohen et al.
2017/0309275 A1 10/2017 Takayanagi et al.
2017/0309289 A1 10/2017 Eronen et al.
2017/0351485 A1 12/2017 Kohler et al.
2018/0018964 A1 1/2018 Reilly et al.
2018/0033447 A1 2/2018 Ramprashad et al.
2018/0077492 A1 3/2018 Yamada et al.
2018/0174583 A1 6/2018 Zhao et al.
2018/0190282 A1 7/2018 Mohammad et al.
2018/0286404 A1 10/2018 Cech et al.
2019/0037363 A1 1/2019 Tzirkel-Hancock et al.
2019/0073999 A1 3/2019 Prémont et al.
2019/0237067 A1 8/2019 Friedman et al.
2019/0333508 A1 10/2019 Rao et al.
2019/0355352 A1 11/2019 Kane et al.
2019/0394339 A1 12/2019 Seo et al.
2020/0191595 A1* 6/2020 Chipouras .......... G01C 21/3655
2020/0294092 A1* 9/2020 Tong ...................... G06V 20/59
2021/0318125 A1* 10/2021 Ahmed .............. G01C 21/3407
2023/0401274 A1 12/2023 Denninghoff

FOREIGN PATENT DOCUMENTS

AU 2010246465 A1 * 8/2011 ............. G06F 40/55
CA 2897966 C * 10/2023 ............. B60K 35/90
CN 102117221 A * 7/2011 ............. G06F 3/165
CN 116734836 A * 9/2023 ......... G01C 21/3461
DE 102013004444 A1 * 9/2014 ............. G01C 21/26
DE 202016106975 U1 * 4/2017 ........... G01C 21/362
DE 202017106586 U1 6/2018
EP 2068123 A2 * 6/2009 ......... G01C 21/3629
EP 3416153 A1 12/2018
JP 3639412 B2 * 4/2005 ........... G08G 1/0969
JP 3834848 B2 10/2006
JP 3902483 B2 4/2007
JP 4135520 B2 8/2008
JP 4348852 B2 * 10/2009
JP 4584434 B2 11/2010
JP 2012168243 A 9/2012
KR 20100003951 A 1/2010
KR 100988792 B1 10/2010
WO 2017138934 A1 8/2017
WO WO-2018051570 A1 * 3/2018 ........... G06F 40/284

OTHER PUBLICATIONS

Enhancing Tourist Experience via Automatic Personalized Route Suggestions (Year: 2024).*

* cited by examiner

AUTOMOTIVE INFOTAINMENT SYSTEM WITH SPATIALLY-COGNIZANT APPLICATIONS THAT INTERACT WITH A SPEECH INTERFACE

RELATED APPLICATIONS

This application is a division of U.S. application Ser. No. 17/539,508, filed Dec. 1, 2021, now U.S. Pat. No. 12,086,501, which claims the benefit of the Dec. 9, 2020 priority date of U.S. Provisional Applications 63/123,110, 63/123,114, 63/123,119, and the Feb. 10, 2021 priority date of U.S. Provisional Application 63/147,991, all of which are incorporated herein by reference.

BACKGROUND

A modern automobile often comes equipped a processing system that is used to receive a designated coordinate and to calculate an optimal route to that coordinate subject to certain constraints imposed by the available paths between the automobile's location and that coordinate. In some cases, the processing system connects to a receiver that receives a signal from which the vehicle's progress towards the designated coordinate can be determined.

It is particularly useful for the processing system to also connect to a speech interface so that audible announcements can be provided to the vehicle's operator. Such instructions assist the operator in following the calculated optimal route.

SUMMARY

In one aspect, the invention features an automotive processing unit that is integrated into a vehicle having a cabin and a loudspeaker that radiates sound into the cabin. The automotive processing unit includes a navigator and an infotainment system. The infotainment system includes a speech interface, an application suite including one or more spatially-cognizant applications, and an automotive assistant that is configured to execute one or more of the spatially-cognizant applications. The speech interface receives a navigation announcement from the navigator and a touring announcement from one of the spatially-cognizant applications. In response, the speech interface then causes a spoken announcement to be made audible in the cabin. It does so by activating the loudspeaker. The spoken announcement includes content from at least one of the touring announcement and the navigation announcement.

Among the embodiments are those in which the spoken announcement is a hybrid announcement. A hybrid announcement is one that comprises content from both the touring announcement and the navigation announcement. In such embodiments, the speech interface combines content from the navigation announcement and the touring announcement to form the hybrid announcement.

Among the embodiments are those in which the speech interface includes a natural-language engine. In some of these embodiments, the natural language engine identifies, based on grammatical structure of one of the announcements, an insertion point for inserting content from into the other to form a hybrid announcement that is then made audible as the spoken announcement. In others, it identifies a sentence in one of the announcements and inserts content from the other announcement at an end of that sentence to form the spoken announcement. In still others, the natural-language engine inserts one announcement between first and second sentences of the other announcement, thereby forming a hybrid announcement that is made audible in the cabin as the spoken announcement. In still others, the natural-language engine identifies a sentence in one second announcement, selects, as an insertion point, a beginning of that sentence, and inserts content from the other announcement at the insertion point to thereby form a hybrid announcement that is made audible in the cabin as the spoken announcement.

Embodiments further include those in which the speech interface forms a hybrid announcement by inserting a word, a phrase, or a cue, for example, a syntactic cue, between the navigation announcement and the touring announcement. This hybrid announcement is then made audible in the cabin as the spoken announcement.

Embodiments also include those in which the speech interface combines touring content from the touring announcement and navigation content from the navigation announcement to form a hybrid announcement. Among these are embodiments in which the touring content and navigation content are delivered using different voices and those in which they are delivered using the same voice.

In still other embodiments, the speech interface includes a summarizer that receives the touring announcement and generates a summarized version thereof. This summarized version is then interleaved into the navigation announcement to form the spoken announcement.

Also, among the embodiments are those in which the infotainment system includes a time scaler that receives touring audio from an application in the application suite, changes a duration thereof, and includes the touring audio, with its duration having been changed, as a constituent of the spoken announcement.

In still other embodiments, the speech interface interleaves content from the touring announcement and the navigation announcement to form a hybrid announcement that includes content from both announcements. This hybrid announcement serving as the spoken announcement.

In some embodiments, the application suite includes an itinerary-generating application that generates an itinerary. The itinerary includes a path and a touring-announcement section along the path. In such embodiments, the spoken announcement, which includes content concerning a point-of-interest that is visible from the touring-announcement section, is made audible in the cabin while the vehicle is traversing the touring-announcement section.

In other embodiments, the application suite of the infotainment system includes an itinerary-generating application that simulates a journey by the vehicle along a path from which a point-of-interest is visible and, based on the simulation, to designate a section along the path to be a touring-announcement section. In these embodiments, the touring-announcement section is a section along the path that has the property that, when the vehicle traverses that section, content concerning the point-of-interest is made audible in the cabin as part of the spoken announcement.

In yet other embodiments, the application suite includes an itinerary-generating application that generates an itinerary and a touring application that accesses the itinerary and causes delivery of the spoken announcement while the vehicle is in a touring-announcement section defined in the itinerary. In such embodiments, the spoken announcement includes information about a point-of-interest that is visible from the touring-announcement section.

In still other embodiments, the application suite includes a touring application that accesses an itinerary that identifies a path that includes a touring-announcement section from which a point-of-interest is visible, that determines that the vehicle is in the touring-announcement section, and that postpones delivery of information that is scheduled to be delivered in a spoken announcement while the vehicle is in the touring-announcement section.

Also, among the embodiments are those in which the application suite includes a touring application that accesses an itinerary that identifies a path that includes a touring-announcement section from which a point-of-interest would be visible from the vehicle were the vehicle at the touring-announcement section. In some of these embodiments, the touring application receives certain and causes the touring-announcement section to be altered in response to that information. Embodiments include those in which the information is indicative of traffic conditions and those in which the information is from an occupant-monitoring system.

Among the embodiments that include an itinerary-generating application that generates an itinerary that includes a path to be traversed by the vehicle are those that control when announcements are permitted to occur. In some of these, the path is divided into sections that are reserved for one type of announcement only, in which case all other types are prohibited. In some of these embodiments, the choice depends on cognitive load, with announcements of one or both types being prohibited in sections that have high cognitive load.

Embodiments include those in which an itinerary-generating application generates an itinerary that includes a path having section that impose different cognitive loads on the driver of a vehicle as it traverses the path. In such cases, the itinerary-generating application avoids scheduling announcements during periods of high cognitive load. Thus, if a path has a first section having a first cognitive load and a second section having a second cognitive load that is less than the first, then given a choice, the application schedules the announcement during the second section. In some cases, the section during which the spoken announcement is permitted is an intersection-free section that is between two intersections. In other cases, the section is one having a sufficiently high radius-of-curvature. Thus, given two sections with different radii-of-curvature, the application will choose that having the larger of the two radii.

In other embodiments, an application designates a section of a generated path as being suitable for a touring announcement that includes information concerning a point-of-interest if that point-of-interest is visible from that section of the path. In others, the section designated as suitable is one for which a ray that extends between the point-of-interest and any point on that section does not pass through an obstruction. Conversely, sections designated as unsuited to the announcement are those in which the ray passes through an obstruction. In still other embodiments, prevailing weather conditions are taken into account. This is useful since visibility, in many cases, depends on weather. In such cases, prevailing weather conditions are used to identify a section of the path from which a point-of-interest is visible and to cause a touring announcement concerning the point-of-interest to be made while the vehicle is traversing that section of the path. In still other embodiments, the application takes into account time-of-day to identify a section of the path from which a point-of-interest is visible and to cause a touring announcement concerning the point-of-interest to be made while the vehicle is traversing that section of the path.

Also, among the embodiments are those in which an itinerary-generating application generates an itinerary that includes a path that comprises muted sections and unmuted sections. These sections are so designated based on constraints on delivering the touring announcement. In such embodiments, a touring announcement is permitted only while the vehicle is traversing an unmuted section.

In still other embodiments, an itinerary-generating application generates an itinerary that includes a path having a section in which there exists some impediment to delivery of the touring announcement. In such embodiments, the application permits a touring announcement to be made only when the vehicle is outside of this section.

Also, among the embodiments are those in which the automotive processing unit includes a navigator that has calculated a path between an origin and a destination and a detouring application that provides, after the vehicle has begun traversing the path, real-time touring announcements concerning points-of-interest. These points-of-interest are invisible from the calculated path.

In other embodiments, a detouring application detects a vehicle's approach to a decision point on a calculated path. This decision point has an associated salient alternative and a standard alternative. Upon determine that the salient alternative has been selected, the detouring application consults a feature database concerning the salient alternative and offers the driver one or more guided tours through the salient alternative.

In alternative embodiments, a detouring application detects that the vehicle has left a calculated route between an origin and a destination offers the driver a guided detour from among one or more guided detours that begin where the driver left the calculated route.

Also, among the embodiments are those in which a detouring application detects that a vehicle has left a calculated route between an origin and a destination, offers the driver a guided detour from among one or more guided detours that begin where the driver left the calculated route, and infers a selection of the guided detour based on a course steered by the driver.

In other embodiments, the application suite includes a detouring application that accesses data that identifies decision points along a path between an origin and a destination. At each of these decision points to choose between a standard alternative and a salient alternative. The standard alternative is one in which the vehicle remains on the path and the salient alternative is one in which the vehicle does not remain on the path. It stands to reason that there can only be one standard alternative and that there can be one or more salient alternatives. For example, in a four-way intersection of two-way streets, assuming no U-turn, there would be two salient alternatives.

Among the embodiments with a detouring application are those in which the detouring application dynamically creates decision points along a path being traversed by the vehicle. Each decision point provides a driver of the vehicle with an opportunity to choose between at most one standard alternative and one or more salient alternatives.

In still other embodiments, a detouring application interprets the vehicle's the direction, or orientation, of the vehicle's velocity vector and relies on it as a basis for inferring a selection, by a driver of the vehicle, a particular guided detour.

Yet other embodiments include those in which a detouring application poses a question to a driver of a vehicle upon detecting that the vehicle has left a calculated path between an origin and a destination and to interpret an acceleration of the vehicle as an answer to the question.

In some embodiments, the application suite comprises a touring application that is configured to receive an origin and destination and to identify a tour that comprises a path and an interest score. The path extends between the origin and destination and wherein the interest score depends at least in part on one or more points-of-interest along the path.

Among these are embodiments in which the touring application consults a point-of-interest database that includes information indicative of points-of-interest between the origin and the destination and that is located at the vehicle. In other embodiments, the touring application also consults a remote point-of-interest database that is maintained by a remote server. In such cases, the apparatus further comprises a network interface to provide communication between the touring application and the remote server. Among these are embodiments in which the remote server dynamically updates the remote point-of-interest database based on queries from occupants of a population of vehicles. As a result, it is possible to identify trending points-of-interest.

A variety of ways are available to determine a tour's interest score. In some embodiments, an interest score depends on how many points-of-interest are on the tour. In such embodiments, a score is assigned based on a first point-of-interest on the tour and then modified based on a second point-of-interest along the tour. As a result, the interest score depends, at least in part, on a number of points-of-interest in the tour. Another way to determine interest score is to assign an interest score to the tour based on a weighted sum of scores associated with each of a plurality of points-of-interest in the tour.

In some embodiments, too low an interest score disqualifies a path from rising to the level of a tour. In such embodiments, a touring identifies a tour between an origin and a destination only if that tour's interest score is above a threshold interest score.

Also, among the embodiments are those in which the application suite comprises a first touring application that is a constituent of a distributed touring system that comprises a second touring application and a remote server. The second touring application executes on a portable device. remote server switches seamlessly between the first and second touring applications thereby enabling a tour to include first and second tour segments. The first tour segment is one in which the remote server communicates with the first touring application. The second tour segment is one in which the remote server communicates with the second tour segment. A suitable portable device is a smart phone or portable telephone. This seamless switching permits a tour to be carried out via a vehicle and then on foot.

A variety of ways are available for causing the transition between the two tour segments. In some embodiments, the remote server receives information indicating that a mode of transportation of an occupant of the vehicle has changed, the occupant being one who carries the portable device. In others, the remote server receives information indicating that the portable device has moved independently of the vehicle or that a connection between the portable device and infotainment system has been interrupted. Either of these would be likely to occur if the vehicle has been parked and the occupant, who is carrying the portable device, has left the vehicle, and begun walking.

In some of the foregoing embodiments, the remote server provides data to the first touring application at a pace that is consistent with the velocity of the vehicle and provides data to the second touring application at a pace that is consistent with the velocity of the portable device.

Also, among the embodiments are those in which remote server transitions from providing data to the first tour-guide to providing data to the second tour-guide upon receiving information indicative of occurrence of a first event, and the remote server transitions from providing data to the second touring-application to providing the data to the first touring-application upon receiving information indicative of occurrence of a second event.

The method and apparatus as described and claimed herein are non-abstract. No description has been offered of any abstract implementations. Accordingly, the claims are to be construed as covering only non-abstract subject matter. Any person who construed them otherwise would be construing them incorrectly and without regard to the specification.

Applicant, acting as his own lexicographer, hereby defines "non-abstract" as the complement of "abstract" as that term has been defined by the courts of the United States as of the filing date of this application.

The method and apparatus as described herein is also one that has a technical effect. In many cases, the technical effect will be non-obvious. However, it exists. Therefore, any person who construes the claims as lacking a technical effect is merely displaying an inability to discern the technical effect as a result of its non-obviousness.

The processing system that executes the method is not a generic computer. It is a specialized digital electronic device that is specially adapted for operation in a passenger vehicle to accommodate the various technical constraints imposed by that environment including limited space and power and operation in environments of extreme heat or cold and resistance to shock and other forces that result from acceleration.

Additionally, though it is convenient to implement the method using software instructions, it is known that virtually any set of software instructions can be implemented by specially designed hardware, which is typically provided as an application-specific integrated circuit. The claims presented herein are also intended to cover such an implementation.

Other features and advantages of the invention are apparent from the following description, and from the claims.

DESCRIPTION

Figure 1:
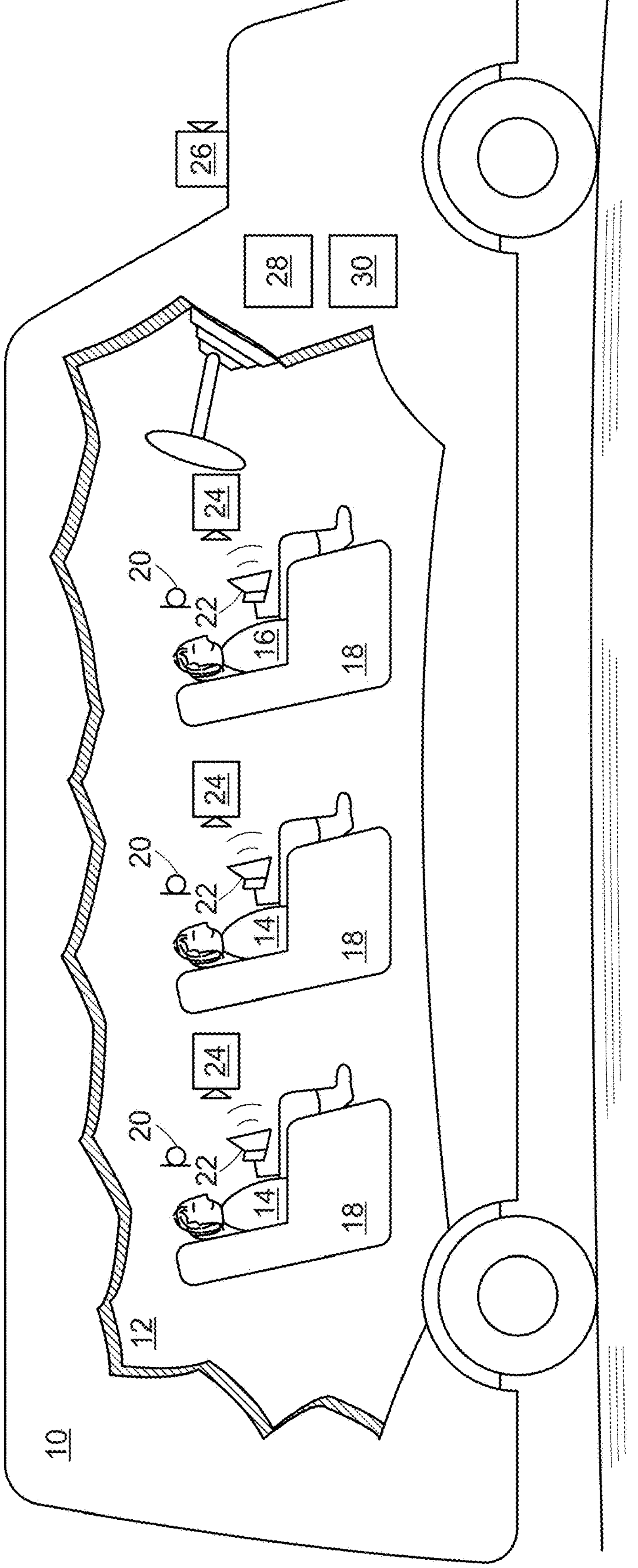
FIG. 1 shows a vehicle having an automotive processing-unit.

FIG. 1 shows a vehicle 10 having a passenger cabin 12 that carries occupants 14. Among the occupants 14 is a driver 16 who operates the vehicle 10. In those embodiments in which the vehicle 10 is autonomous, no driver 16 is necessary.

Each occupant 14, 16 is seated in a seat 18. Each seat has an associated microphone 20 and a loudspeaker 22.

The vehicle 10 also includes one or more internal cameras 24. The internal cameras 24 are directed towards various portions of the cabin 12. An internal camera 24 therefore often has an occupant 14, 16 in its field of view.

The vehicle 10 also includes one or more external cameras 26. The external cameras 26 are directed towards the vehicle's environment. These external cameras 26 are therefore useful for identifying features in the vehicle's surroundings.

In those embodiments in which the vehicle 10 requires a driver 16, the internal cameras 24 and the microphones 20 communicate with an occupant monitor 28 that evaluates the driver's state. In some embodiments, the occupant monitor 28 does so by recognizing the driver's gaze direction or otherwise does so by collecting information indicative of the driver's receptiveness to delivery of information. The vehicle 10 further includes an on-board automotive-processing unit 30, details of which can be seen in FIG. 2.

Figure 2:
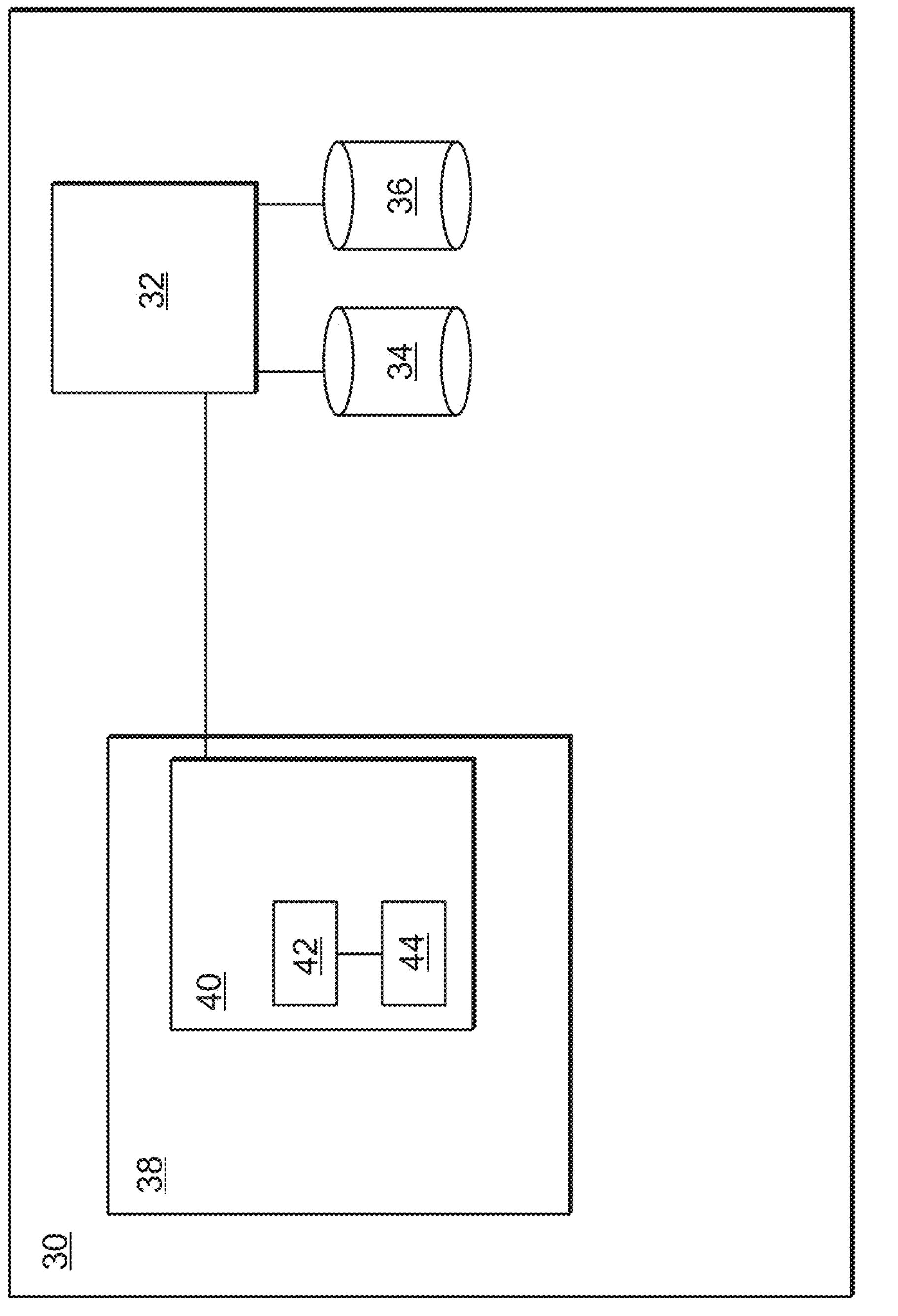
FIG. 2 shows components of a head unit in the automotive processing-unit of FIG. 1.

Referring now to FIG. 2, the automotive-processing unit 30 features a navigator 32 that receives signals, processes them to output spatial coordinates, and displays a representation of the vehicle's spatial environment on a map selected from a map database 34. In addition, the navigator 32 has access to a feature database 36 that provides information concerning points-of-interest corresponding to various spatial coordinates.

The automotive-processing unit 30 also includes an infotainment system 38 having a head unit 40. The head unit 40 comprises a processor 42 and a memory 44. The infotainment system 38 interfaces with a peripheral-device set that includes one or more peripheral devices. Examples of peripheral devices include one or more of: the microphones 20, the loudspeakers 22, and the internal and external cameras 24, 26.

Figure 3:
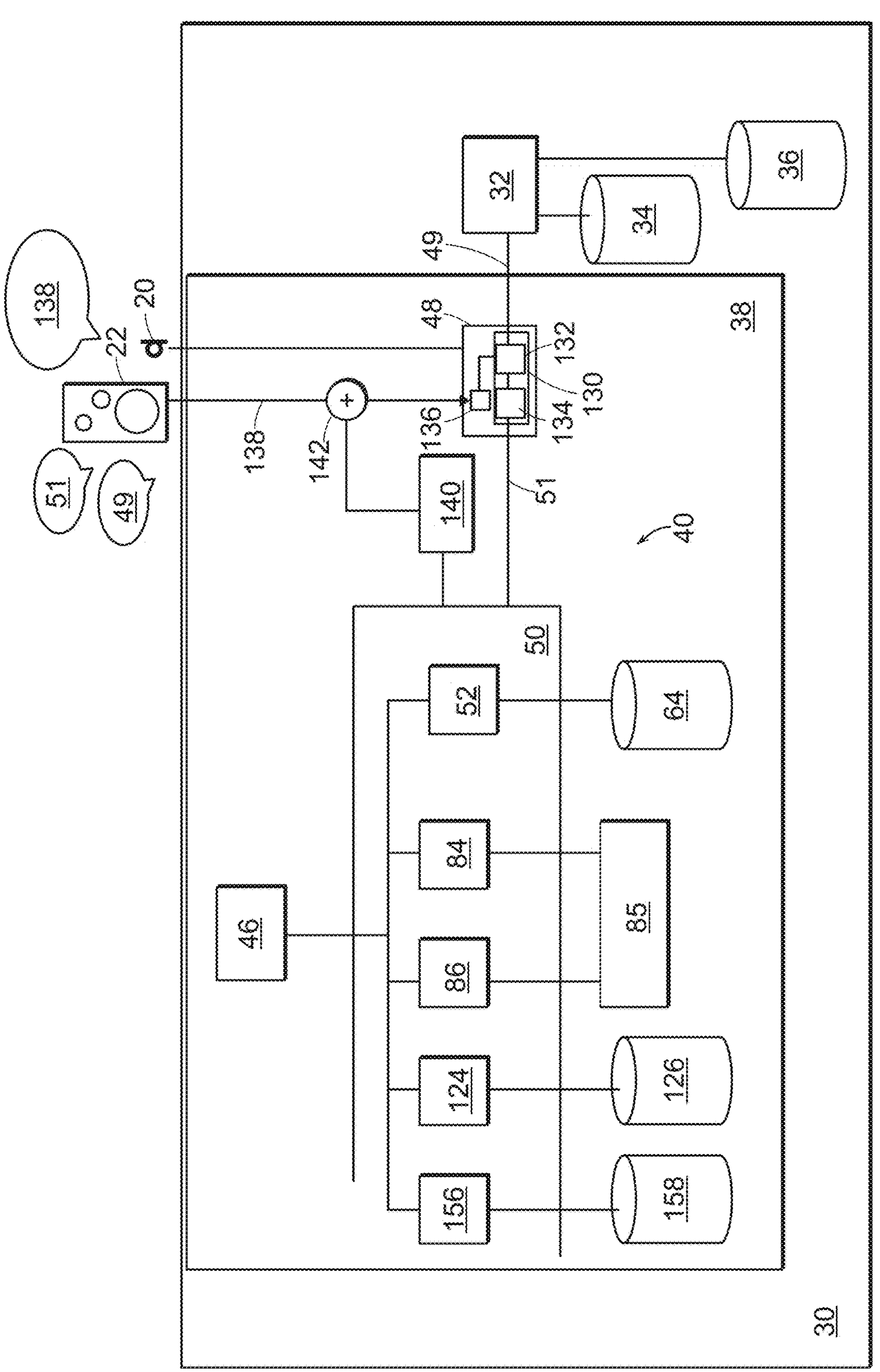
FIG. 3 shows architecture of a head unit in the automotive processing-unit shown in FIG. 1.

Referring now to FIG. 3, an automotive assistant 46 executing in the head unit 40 functions as the head unit's operating system. The automotive assistant 46 thus enables the head unit 40 to execute various applications among which is a speech interface 48. The speech interface 48 receives navigation announcements 49 from the navigator 32 and makes them audible in the cabin 12 through the loudspeaker 22. A navigation announcement 49 alerts the driver 16 to forthcoming changes in course.

The automotive assistant 46 also permits execution of one or more spatially-cognizant applications that are part of an application suite 50. Such applications are said to be "spatially cognizant" because their operation depends at least in part on information received from the navigator 32. The speech interface 48 receives touring announcements 51 from any of the applications in the application suite 50 and makes those touring announcements audible in the cabin 12 through the loudspeaker 22.

In some embodiments, the speech interface 48 uses the same voice to deliver navigation announcements 49 and touring announcements 51. In other embodiments, the speech interface 48 delivers touring announcements 51 using a voice that differs from that used to deliver navigation announcements 49.

As used herein, an "announcement" refers to information and not the particular form into which the information has been encoded. In their final form, the navigation announcements 49 and touring announcements 51 are made audible in the cabin 12 using the loudspeaker 22 and are hence encoded as sound waves. However, both existed prior to being made audible, albeit in different forms. Throughout operation of the infotainment system 38, the navigation announcements 49 and touring announcements 51 will manifest themselves in different forms while retaining their information during and after such transformations. Accordingly, both the navigation announcements 49 and touring announcements 51 will be referred to without reference to the form in which they exist and with the understanding that the form of an announcement is mutable even though the announcement itself remains the same.

Figure 4:
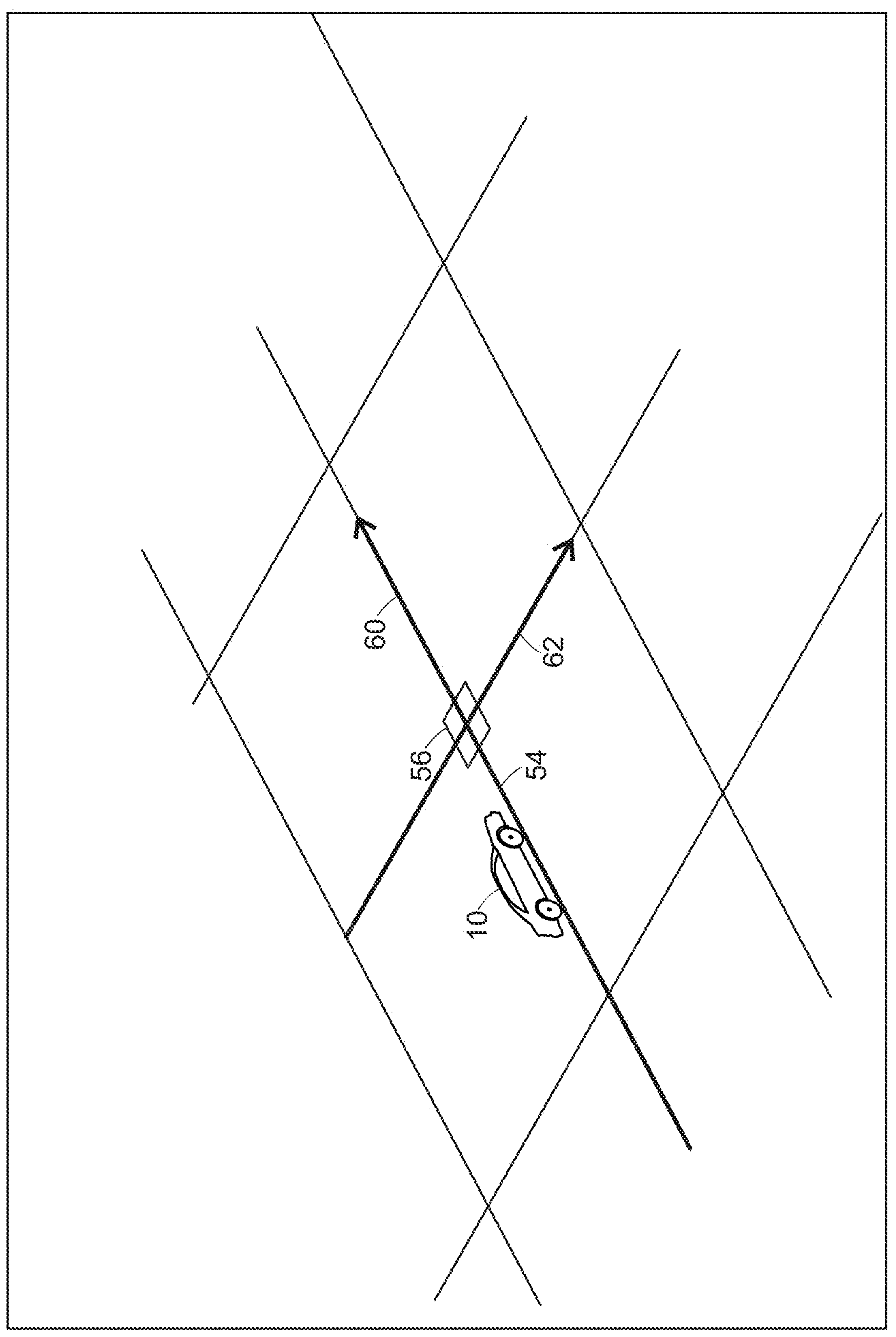
FIG. 4 shows a vehicle equipped with an automotive processing unit traversing a path.

Referring now to FIG. 4, a detouring application 52 from the application suite 50 defines a path 54 through a network of roads. In those cases in which the navigator 32 is in use, the detouring application 52 uses, as the defined path 54, the route computed by the navigator 32 between the vehicle's origin and its destination. In other cases, for example when the navigator 32 is not being used, the detouring application 52 uses, as the path 54, the particular road along which the vehicle 10 is traveling at the time.

A typical path 54 inherently has decision points 56 at which an opportunity to deviate from the path 54 exists. Examples of a decision point 56 include a highway exit or an intersection between roads. In some embodiments, the detouring application 52 accesses data that identifies decision points 56. In others, the detouring application 52 dynamically identifies decision points 56.

At each decision point 56, the driver 16 can choose to stay on the path 54 or leave the path 54. Thus, each decision point 56 has at least two alternatives: a standard alternative 60, in which the driver 16 chooses to remain on the path 54, and a salient alternative 62, in which the driver 16 chooses to leave the path 54.

As shown in FIG. 3, the detouring application 52 is in communication with detour data 64. Each decision point 56 is associated with a subset of the detour data 64. When the driver 16 chooses the salient alternative 62, the detouring application 52 uses the identity of the decision point 56 to consult a corresponding portion of the detour data 64.

The navigator 32 provides location information to the detouring application 52. The detouring application 52 is thus able to detect whether the vehicle 10 is either already on the salient alternative 62 or about to be on the salient alternative 62. Such detection can be carried out in a variety of ways. One method relies on geo-fencing. Another method relies on detecting a deviation from the path 54 by more than a threshold amount. Additional embodiments include those in which the detouring application 52 detects the choice of the salient alternative 62 using other clues, such as by detecting the operation of a turn signal just prior to a scheduled arrival at a decision point 56. Since one does not normally use the turn signal when staying on the path 54, operation of the turn signal is indicative of the driver's intent to deviate from the path 54.

The detour data 64 for a particular decision point 56 includes information drawn from the feature database 36 shown in FIG. 2. Such information includes information about attractions or points-of-interest in the vicinity. Such information also includes suggested detours, such as a long detour 66, a scenic detour 68, and a short detour 70 shown in FIG. 5, each of which begins at the decision point 56 and returns to the path 54, preferably downstream of the decision point 56.

Figure 5:
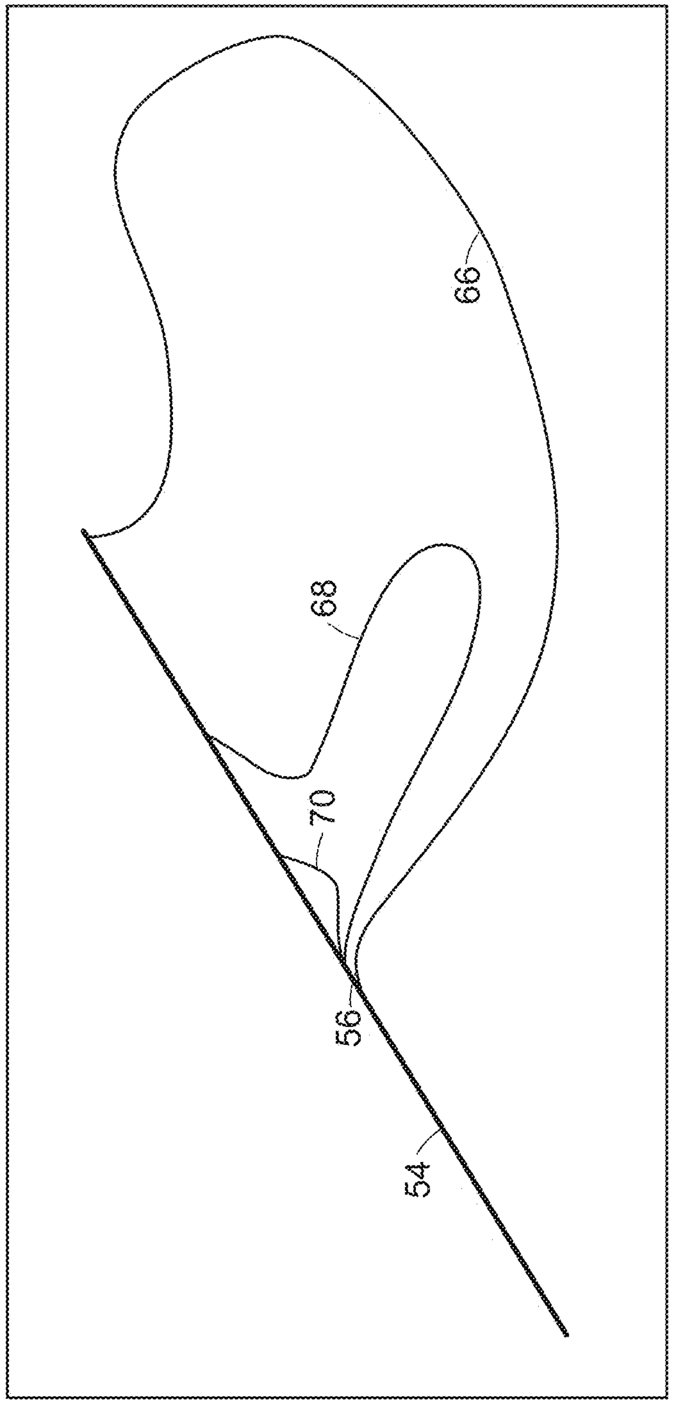
FIG. 5 shows a selection of detours from the path shown in FIG. 4.
Figure 6:
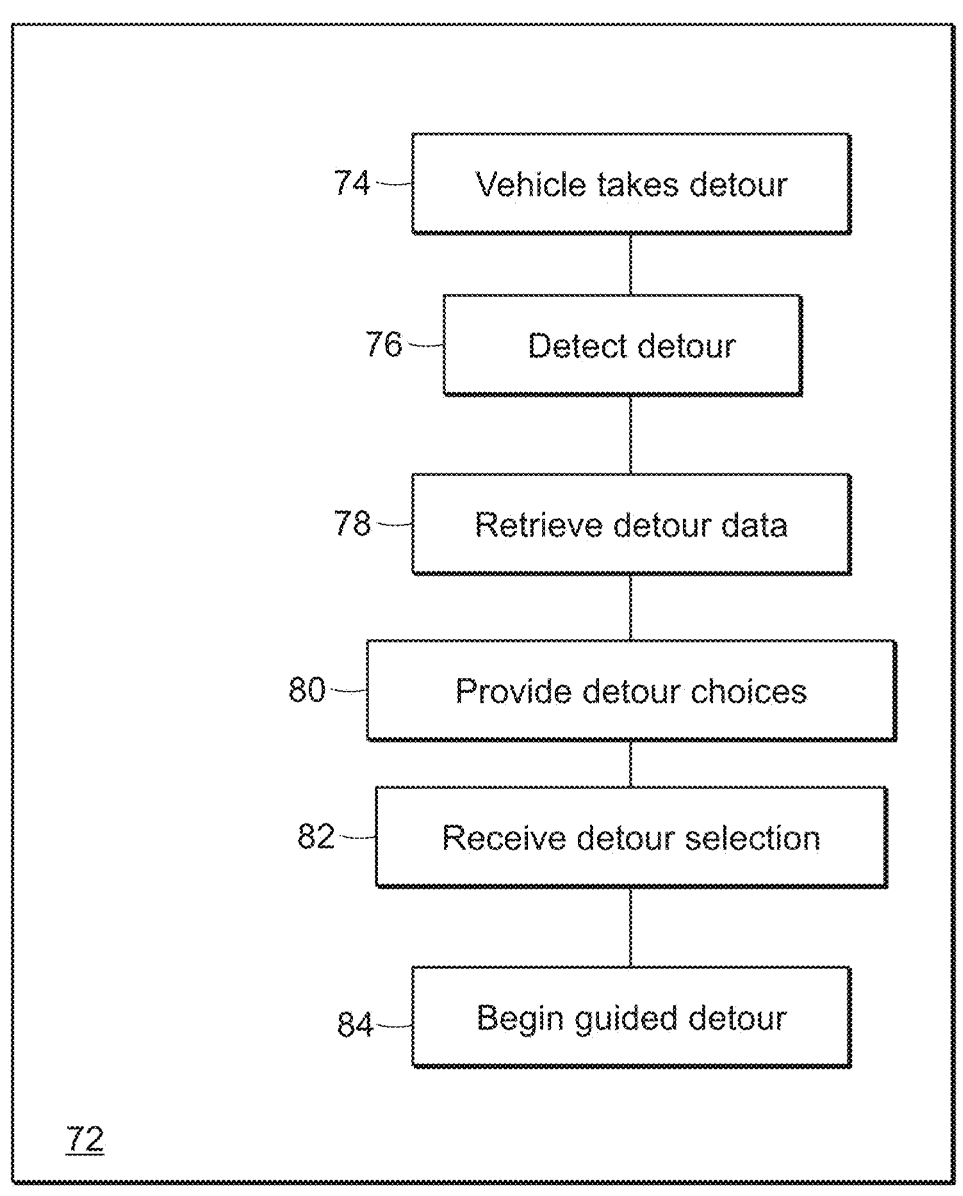
FIG. 6 shows a method executed by a detouring application executing within the head unit shown in FIG. 3.

In a process 72 as shown in FIG. 6, a vehicle 10 at a decision point 56 takes the exit that is marked for a particular national park (step 74). In response, the detouring application 52 detects the choice of the salient alternative 62 (step 76) and retrieves detour data 64 relevant to the national park (step 78). The detouring application 52 may then provide the driver with choices of guided detours through the national park, as shown in FIG. 5 (step 80).

The detouring application 52 then receives the driver's selection of a detour (step 82). The driver does so by either using the speech interface 48 or implicitly by turning in a direction that is consistent with the beginning of a particular detour. Then, the detouring application 52 provides suitably interesting narration delivered at appropriate spatial locations along the detour (step 84).

Referring back to FIG. 3, in some embodiments, the application suite 50 includes an itinerary-generating application 84 and a touring application 86. The itinerary-generating application 84 creates an itinerary 85 which the touring application 86 then uses as a basis for a tour of a region, a portion of which is shown in FIG. 7.

Figure 7:
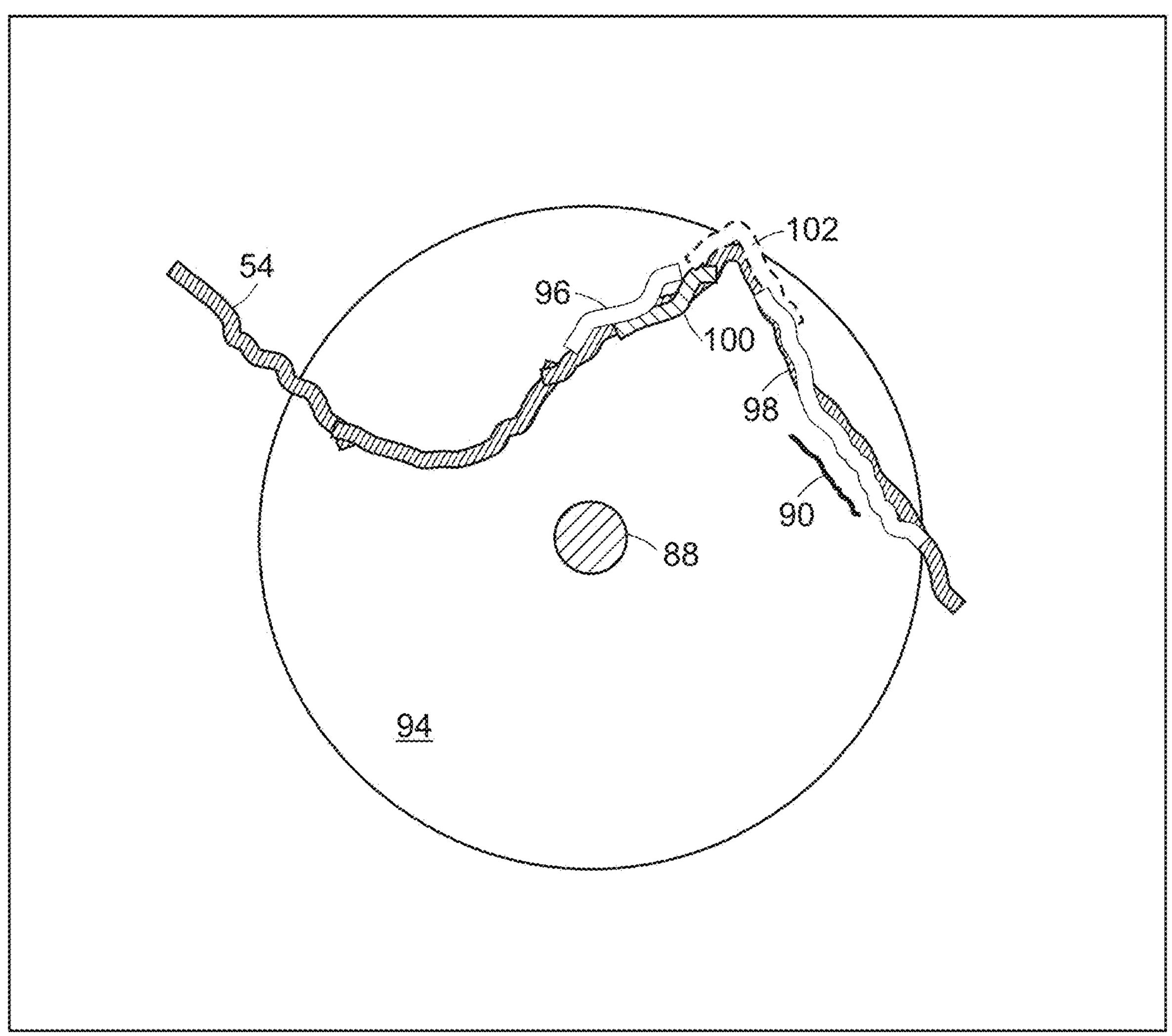
FIG. 7 shows a path that passes by a point-of-interest.

Like FIG. 4, FIG. 7 shows a path 54 to be traversed by the vehicle 10. As the vehicle 10 proceeds along the path 54, one or more point-of-interest 88 will come into view. During certain announcement periods 90, the touring application 86 delivers content concerning the point-of-interest 88, in spoken form, for the benefit of the vehicle's occupants 14.

Prior to the beginning the road trip, the itinerary-generating application 84 schedules the announcement periods 90 during which the touring application 86 is permitted to deliver content, i.e., to make a touring announcement 51. This schedule of announcement periods 90 becomes part of the itinerary 85.

The itinerary-generating application 84 faces certain complications when scheduling the announcement periods 90. These complications arise because the touring application 86, in addition to knowing about the various points-of-interest 88, faces certain constraints that exist along the path 54.

A first constraint is a visibility constraint. The point-of-interest 88 should be easily visible during the announcement period 90. It would not do to have an announcement period 90 while the point-of-interest 88 is receding into the distance or when the point-of-interest 88 is not even visible. Ideally, the vehicle 10 should be approaching the point-of-interest 88 or passing it so that the occupants 14 (and most especially, the driver 16) do not have to turn around to see it.

A second constraint is an interference constraint. The announcement period 90 must not interfere with speech carried out by any concurrently executing applications from the application suite 50 or elsewhere. For example, if the navigator 32 is in the midst of telling the driver 16 to make a turn, the touring application 86 should not barge in to discuss the historical importance of a nearby burial mound.

A third constraint is a cognitive constraint. As the vehicle 10 traverses the path 54, there will be certain periods that require high cognitive load. Such periods may occur, for example, while the vehicle 10 is negotiating a complex highway interchange or a rotary. For the touring application 86 to add to this cognitive load by delivering a lecture concerning some nearby point-of-interest 88 would, again, be poor form.

A fourth constraint is that the announcement period 90 inherently has some an announcement duration 92. The touring application 86 must have an announcement period 90 that is at least as long as the announcement duration 92. Otherwise, it will not be able to deliver its content without interruption. Thus, there must be a continuous section of the path 54 that is free of any other constraint for an interval that accommodates the announcement duration 92.

It is useful to consider the path 54 as being divided into muted sections and unmuted sections. When the vehicle 10 is in a muted section, the touring application 86 is forbidden from speaking. When the vehicle 10 is in an unmuted section, the touring application 86 is permitted to speak. The itinerary generator's challenge is to identify appropriate unmuted sections and to schedule the announcement periods 90 accordingly.

To assist it in scheduling announcement periods 90, the itinerary-generating application 84 associates each point-of-interest 88 with a footprint 94. As shown in FIG. 7, the path 54 goes through footprints 94 of various points-of-interest 88.

The size and shape of a footprint 94 depend on the prominence of its corresponding point-of-interest 88. In some embodiments, the footprint 94 is such that the point-of-interest 88 will be visible from a vehicle 10 that is within the footprint 94. Thus, a volcano rising from an otherwise flat plain will have a large footprint 94 whereas a graveyard tucked between skyscrapers in a city center will have a relatively small footprint 94.

The footprint's geometry also depends on weather. For instance, clear weather will tend to enlarge a footprint 94 whereas foggy weather or blizzard conditions will tend to shrink the footprint 94.

The footprint's geometry also depends on time-of-day. For example, the position of the sun may generate glare that makes the point-of-interest 88 difficult to see from certain angles at certain times-of-day. At night, many outdoor points-of-interest may be difficult to see unless either bright moonlight or intense boreal activity renders them visible, at least in silhouette.

The footprint 94 thus defines a region during which the point-of-interest 88 is likely to be visible. The itinerary-generating application 84 therefore attempts to schedule an announcement period 90 for that point-of-interest 88 while the vehicle 10 traverses its footprint 94.

The trip planning process thus includes a planning step in which the itinerary-generating application 84 designates each section on the path 54 as being muted or unmuted. This is a largely deterministic exercise that can be carried out before the tour actually begins.

For example, once a path 54 has been defined, it is possible to predict, with considerable accuracy, where the navigator 32 will be required to give directions. It is also possible to recognize, based on road topology and time-of-day, those portions of the path 54 that are likely to require significant cognitive load to negotiate. Additionally, if the tour is not too far in the future, weather information is available to assist in determining the sizes of the footprints 94.

FIG. 7 illustrates a simple scheduling exercise in which the path 54 features a first high-visibility section 96 and a second high-visibility section 98. The point-of-interest 88 is thus clearly visible on the vehicle's right from anywhere along these high-visibility sections 96, 98. As a result, absent any other constraints, both the first and second high-visibility sections 96, 98 would be suitable for an announcement period 90.

However, as a result of an imminent sharp turn to the right, a navigation-announcement section 100 that has been allocated to a navigation announcement 49 overlaps a significant portion of the first high-visibility section 96. What is left of the first high-visibility section 96 is too short for the touring application 86 to make all but the most perfunctory of announcements. After confirming that this remaining period is too short for the touring application 86 to deliver its content, the itinerary-generating application 84 rules out the first high-visibility section 96.

A high-cognitive-load section 102 spans much of the sharp right turn and overlaps a first portion of the second high-visibility section 98. The first portion of the second high-visibility section 98 is thus a muted section that is unavailable to the touring application 86. However, a second portion of the second high-visibility section 98 is unmuted. The itinerary-generating application 84 confirms that this second portion is long enough for the touring application 86 to deliver its content. Accordingly, the itinerary-generating application 84 schedules the second portion of the second high-visibility section 98 for this purpose.

Figure 8:
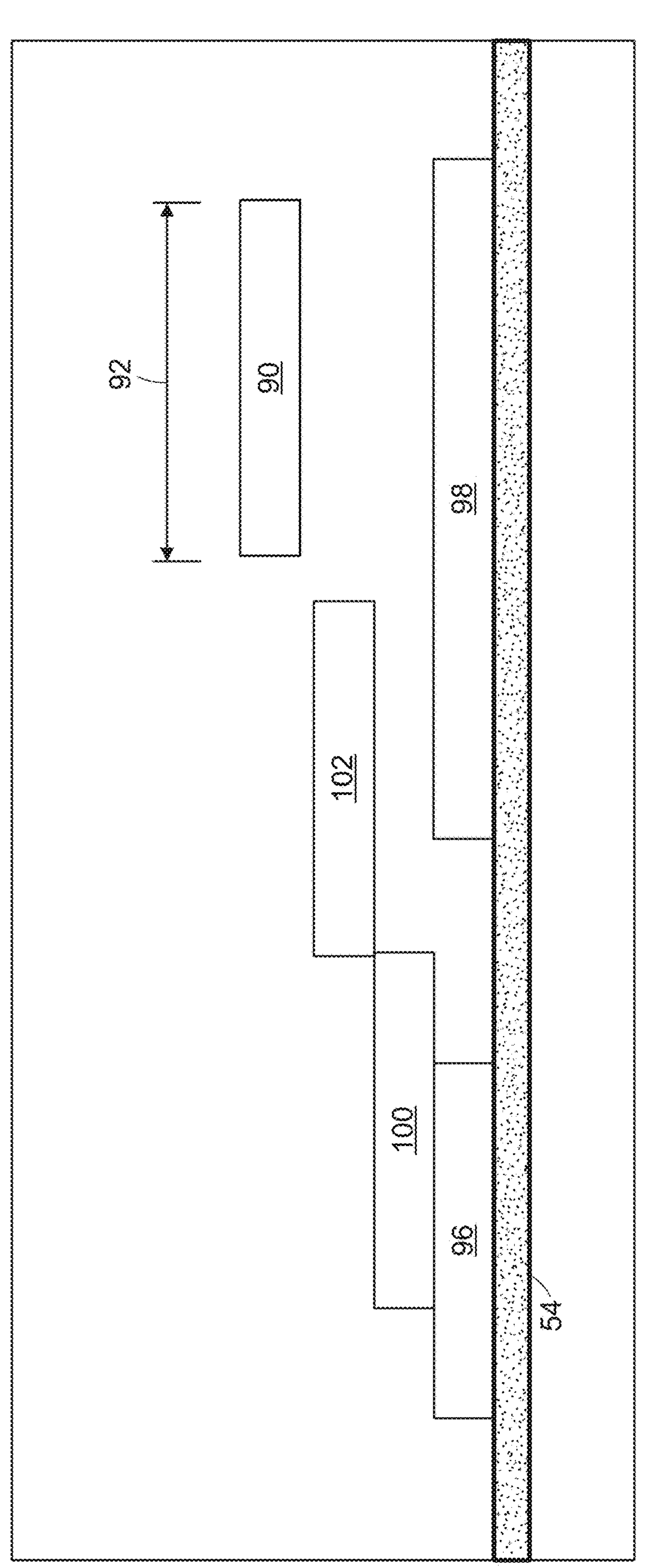
FIG. 8 shows the path of FIG. 7 following a coordinate transformation.

FIG. 8 shows a portion of the path 54 seen in FIG. 7 but after having undergone a transformation that renders the path 54 as straight and causes the overlaps of the high-cognitive-load section 102 and the navigation-announcement section 100 with the high-visibility sections 96, 98 to be seen without unnecessary distraction.

To accommodate unexpected events that may occur during the tour, it is useful to permit the touring application 86 to execute short-term overrides after the tour has begun. For example, if traffic significantly slows down the vehicle's progress, a section of the path 54 that was previously deemed too short for an announcement period 90 can, as a result of the vehicle's reduced velocity, become long enough to accommodate the announcement period 90. The touring application 86 recognizes that, as a rule, a driver 16 sustains little cognitive load when stuck in traffic. Accordingly, the touring application 86 moves a scheduled announcement period 90 from a later section of the path 54 to this newly available section. This has the added benefit of entertaining the driver 16 at a time when the driver 16 is in most need of such entertainment.

In some cases, the driver 16 makes an unexpected turn. Depending on what the driver 16 does, this may require the touring application 86 to make significant adjustments that include moving and possibly even cancelling announcement periods 90.

In other cases, unexpected developments may substantially increase the driver's cognitive load. For example, just prior to a scheduled announcement period 90, an infant passenger may begin to wail or the driver 16 may become involved in a heated conversation with other occupants 14 in the vehicle 10. The above-mentioned occupant monitor 28, which has been unobtrusively observing the driver 16 all along, recognizes the telltale signs of such cognitive load and signals the touring application 86, which then postpones the scheduled announcement period 90 for a more opportune time.

Figure 9:
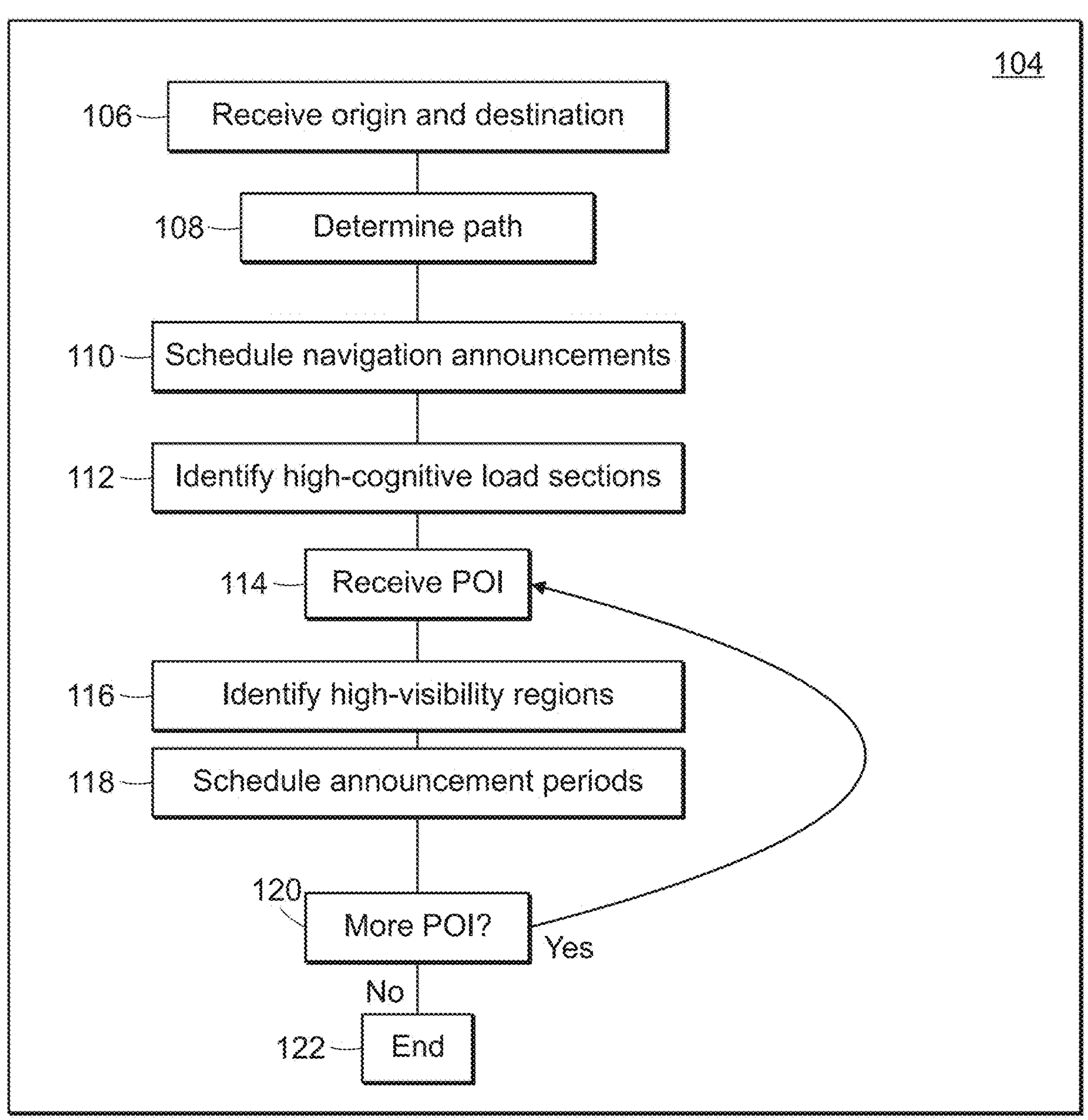
FIG. 9 shows a method carried out by an itinerary-generating application executing within the head unit shown in FIG. 3.

Referring now to FIG. 9, a planning process 104 carried out by the itinerary-generating application 84 begins with the receipt of an origin and destination (step 106). This causes the path 54 to be determined (step 108). It also permits the completion of tasks that are independent of the points-of-interest 88, namely scheduling of navigation announcement 49 (step 110) and identifying high cognitive-load sections 102 of the path 54 (step 112).

The planning process 104 continues with the receipt of one or more points-of-interest 88 (step 114). This permits the identification of high-visibility sections 96, 98 along the path (step 116) and the scheduling of announcement periods 90 (step 118). The process 72 continues with a check to see if more points-of-interest 88 have been identified (step 120). If so, the loop is repeated. If not, the process ends (step 122).

Referring back to FIG. 3, the application suite 50 also includes a tour-guide application 124. The tour-guide application 124 receives current-location information from the navigator 32 and uses it to recognize when a point-of-interest 88 is sufficiently close to make a touring announcement 51. Upon recognizing the proximity of a point-of-interest 88, the tour-guide application 124 retrieves touring content from a touring database 126. The touring content comprises touring text that is to be spoken by the speech interface 48 and touring audio, such as music or sound effects. Together, these form the basis of a touring announcement 51.

A certain urgency is inherent in delivering a navigation announcement 49. To promote more effective execution of navigation instructions, the navigation announcement 49 should occur far enough in advance of a turn to be safely acted upon, but not so far that the driver 16 is likely to forget to act on it. Moreover, in complex situations, such as highway interchanges, the navigator 32 may deliver multiple navigation announcements 49 in rapid-fire succession.

Similarly, a touring announcement 51 is preferably delivered in a timely fashion. Ideally, the touring announcement 51 is delivered while the point-of-interest 88 is in view and certainly before a new point-of-interest has been reached.

Since navigation announcements 49 and touring announcements 51 must both be delivered in a timely fashion, a conflict is possible.

To permit navigation announcements 49 and touring announcements 51 to be delivered together, the speech interface 48 includes a natural-language engine 130 having a mixer 132 and a summarizer 134.

The speech interface 48 intercepts both the touring announcement 51 from the application suite 50 and the navigation announcement 49 from the navigator 32. The navigation announcement 49 is provided to the mixer 132. If no touring announcement 51 is also provided, the mixer 132 does nothing but forward the navigation announcement 49 to a text-to-speech converter 136. This results in the navigation announcement 49 being made audible within the cabin 12 over the loudspeaker 22.

Similarly, if no navigation announcement 49 is provided, then the touring announcement 51 is provided to the summarizer 134. The summarizer 134 carries out a summarization, if necessary, and forwards the resulting summarized touring announcement 51 to the mixer 132. The mixer 132 has no mixing to do and hence does nothing but forward the touring announcement 51 to the text-to-speech converter 136. This results in a touring announcement 51 being made audible within the cabin 12 over the loudspeaker 22.

In some cases, the mixer 132 receives both a navigation announcement 49 and a touring announcement 51. In such cases, the mixer 132 generates a hybrid announcement 138 that incorporates elements of both the navigation announcement 49 and the touring announcement 51. The mixer 132 then provides this hybrid announcement 138 to the text-to-speech converter 136. The hybrid announcement 138 is then made audible within the cabin 12 via the loudspeaker 22.

A hybrid announcement 138 simulates a single person who knows how to navigate while smoothly delivering a running commentary on points-of-interest along the way. This results in an integrated experience that feels, to the driver 16, like a knowledgeable companion who provides driving directions and talks about the various sights in between.

To generate the hybrid announcement 138, the natural-language engine 130 recognizes locations into which navigation announcement 49 can be unobtrusively inserted into touring announcement 51. Such indicators include certain punctuation marks or boundaries between certain semantic units, such as sentences or clauses, including dependent clauses, independent clauses, and subordinate clauses. The natural-language engine 130 also causes the mixer 132 to carry out the insertion of certain bridging words to create a smoother transition between touring announcement 51 and navigation announcement 49, essentially spackling over the seams that would otherwise be apparent to the driver 16 and more closely simulating the speech patterns of an actual person.

As an example, the vehicle 10 may be passing by a prominent church. As a result, the tour-guide application 124 would provide touring announcement 51 that says, "The church on your left, with its two towers, one of which was replaced after a fire in 1985, was built in 1820."

However, at about the same time, the vehicle 10 may also be approaching an intersection at which a right turn is required. As a result, the navigator 32 would provide the navigation announcement 49:

"In a quarter mile, turn right."

Upon receiving the navigation announcement 49 and the touring announcement 51, the natural-language engine 130 causes the mixer 132 to insert the navigation announcement 49 into the touring announcement 51, thereby producing the hybrid announcement 138. An example of such hybrid announcement 138 would be:

"The church on your left, with its two towers, one of which was replaced after a fire in 1985, was built in 1820. By the way, you need to turn right in about a quarter mile. I'll tell you more about that statue in the church courtyard after you've turned."

In forming the hybrid announcement 138, the natural-language engine 130 caused the mixer 132 to do more than simply concatenate the touring announcement 51 and the navigation announcement 49. It also caused the insertion of a syntactic cue, namely the words "By the way." Such a cue draws the driver's attention to the directions, thus reducing the possibility that they will be overlooked.

A syntactic cue may prove insufficient. As a result, some embodiments offer the option of a more pronounced audio cue. Examples include those in which the mixer 132 marks the navigation announcement 49 to be delivered in a different voice or at a different volume to draw attention. Additional examples include an audible beep to alert the driver 16. However, using the same voice and volume for both the navigation announcement 49 and the touring announcement 51 is generally regarded as presenting a less jarring experience.

The natural-language engine 130 invokes the summarizer 134 when, as a result of exigent circumstances, such as an approaching turn, there is not enough time to deliver the touring announcement 51 in its entirety. The summarizer 134 identifies subjects and verbs in the touring announcement 51 so that the grammatical form can be recognized.

The summarizer 134 then deletes superfluous words in an effort to deliver the same information in less time. This is particular useful if the navigation announcement 49 is unusually long or if multiple instances of navigation announcement 49 are being provided.

In some embodiments, it is possible to adjust the overall length of the hybrid announcement 138 by having the text-to-speech converter 136 generate slightly shorter or longer syllables and slightly shorter or longer gaps between words and phrases. It has been found that variations of no more than ten percent in the overall length of an announcement are barely perceptible to the average listener.

As noted above, the touring announcement 51 can, in some cases, include touring audio or sound effects. In such cases, the infotainment system 38 includes a time scaler 140 that shortens or lengthens the touring audio to conform to a hybrid announcement 138 of the desired duration. The touring audio is then provided to a summer 142 so that it can be included as part of the hybrid announcement 138.

Figure 10:
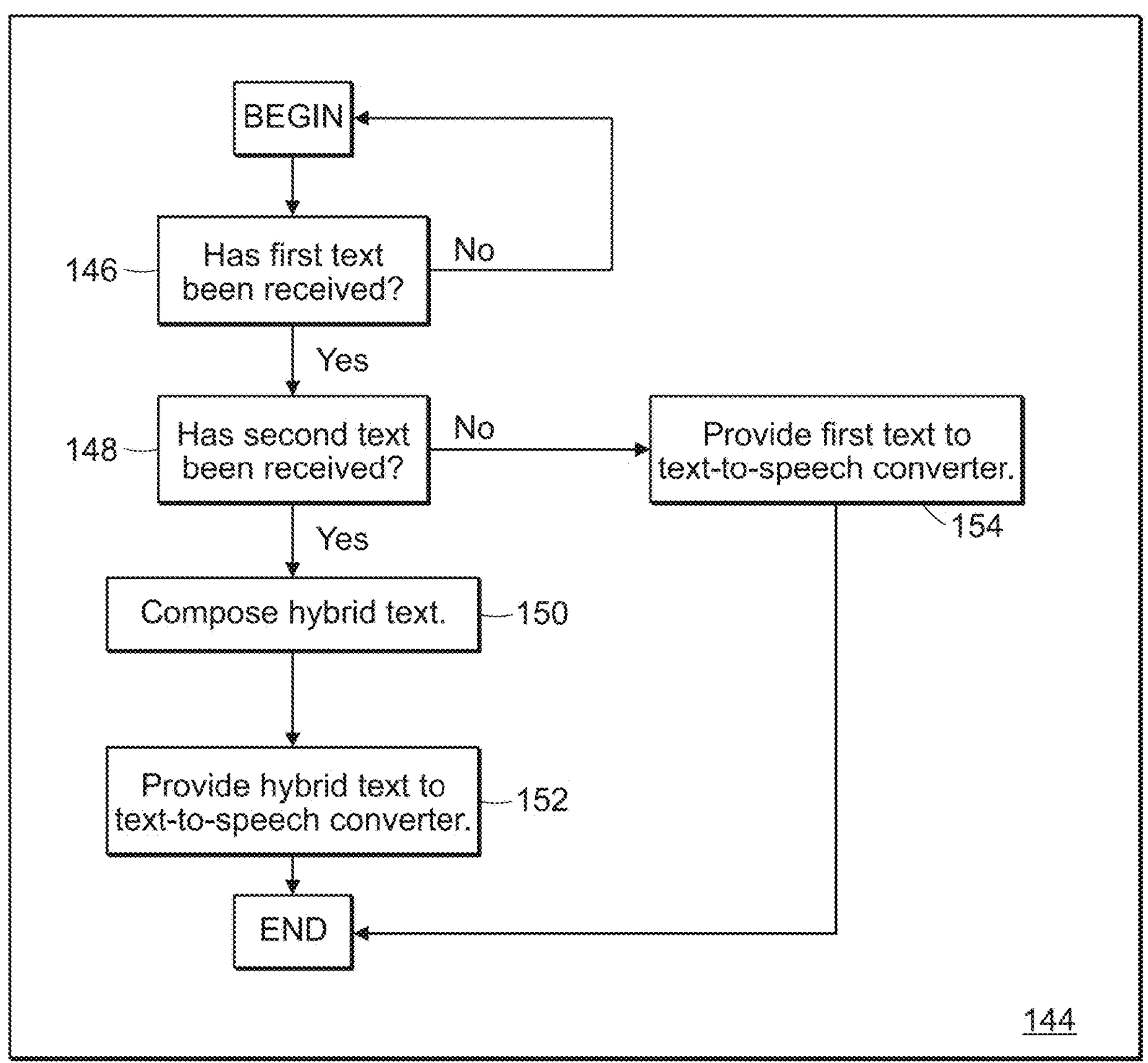
FIG. 10 shows a method for making hybrid announcements that mixes navigation content with touring content from any one of the applications in the application suite shown in FIG. 3.

FIG. 10 shows a process 144 carried out by the speech interface 48 that begins with asking whether any text has been received from a source 124, 32 (step 146) and if so, whether any text has been received from another source 32, 124 (step 148). If not, the text from the first source 124 is simply provided to the text-to-speech converter 136 (step 150). Otherwise, the speech interface 48 composes hybrid announcement 138 using the text from the two sources 124, 32 (step 152) and provides this hybrid announcement 138 to the text-to-speech converter 136 (step 154).

Referring back to FIG. 3, embodiments further include those in which the application suite 50 features a touring application 156. The touring application 156 accesses local point-of-interest database 158. The touring application 156 operates in two different modes: a guide mode and an exploratory mode.

In the guide mode, the touring application 156 provides spoken instructions that guide the vehicle's driver 16 past various points-of-interest 88. As it does so, it uses the speech interface 48 to provide touring announcements 51. The touring announcements 51 feature narration calculated to hold the driver's interest.

Figure 11:
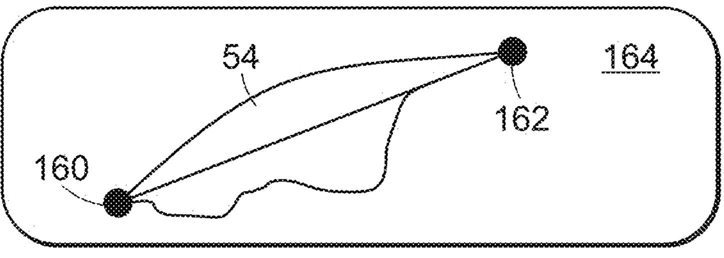
FIG. 11 shows paths within an excursion region that includes an origin and destination.

Referring now to FIG. 11, the exploratory mode is intended to address a driver 16 who intends to travel between an origin 160 and destination 162. However, rather than travel via the shortest route, the driver 16 may have an urge to explore the landscape along the way. This driver 16 would thus like to know interesting places can be seen along the way without excessively compromising the length of planned journey between the origin 160 and the destination 162.

In the exploratory mode, the touring application 156 receives the driver's choice of an origin 160 and destination 162 and provides one or more diversions that encompass points-of-interest 88 that may interest the driver 16. This choice of origin 160 and destination 162 defines an excursion region 164 that extends is proximate to both the origin 160 and destination 162. As used herein, "proximate" also includes the case in which the excursion region 164 includes one or both of the origin 160 and the destination 162.

Typically, this excursion region 164 encompasses one or more paths 54. These paths 54 are those that would have been calculated by the navigator 32 in response to a request by the driver 16 for paths between the origin 160 and the destination 162.

The topology of the excursion region 164, and hence the meaning of "proximate," depends on the driver's desire to avoid lengthening the planned voyage by an excessive amount. Thus, in some embodiments, the driver 16 also specifies the maximum extent by which a diversion would extend the planned voyage between the origin 160 and destination 162. A driver 16 who is has the time for a lengthy excursion would thus be presented with a larger excursion region 164. In contrast, a driver 16 who is in somewhat of a hurry may be presented with an excursion region 164 that takes the form of a narrow strip along the shortest path 54 between the origin 160 and the destination 162.

Figure 12:
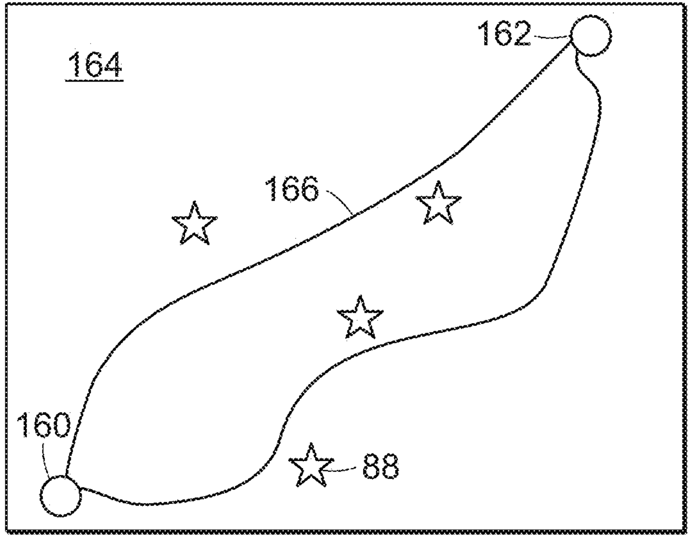
FIG. 12 shows tours provided by the touring application guide shown in FIG. 3 based on the paths shown in FIG. 11.

In defining the excursion region 164, the touring application 156 consults the local point-of-interest database 158 to identify points-of-interest 88 and the distances of those points-of-interest 88 from a calculated path 54. excursion region 164. Having done so, the touring application 156 cooperates with the navigator 32 to identify one or more tours 166 that traverse the excursion region 164, as shown in FIG. 12.

Each tour 166 comprises a path 54 in combination with an interest value that is associated with that path 54. The interest value depends on the distribution of points-of-interest 88 along the path 54. For example, a lengthy tour 166 whose sole point-of-interest 88 is a toxic waste site from a famous environmental disaster may have a relatively low interest value. In contrast, a short tour 166 along a brightly lit street lined with casinos may have a higher interest value. Based on their respective interest values, it is possible to rank tours 166 and to invite the driver 16 to choose one of the available tours 166 between the origin 160 and the destination 162.

In some embodiments, the touring application 156 displays the highest-ranking tour 166 and invites the driver to select it. In other embodiments, the touring application 156 provides information that has been selected to increase the probability that the driver 16 will select the tour 166. Other embodiments are those in which the touring application 156 displays a selection of tours 166 and invites the driver 16 to choose one of them.

In either case, once the driver 16 selects a tour 166, the touring application 156 begins operating in guide mode.

Figure 13:
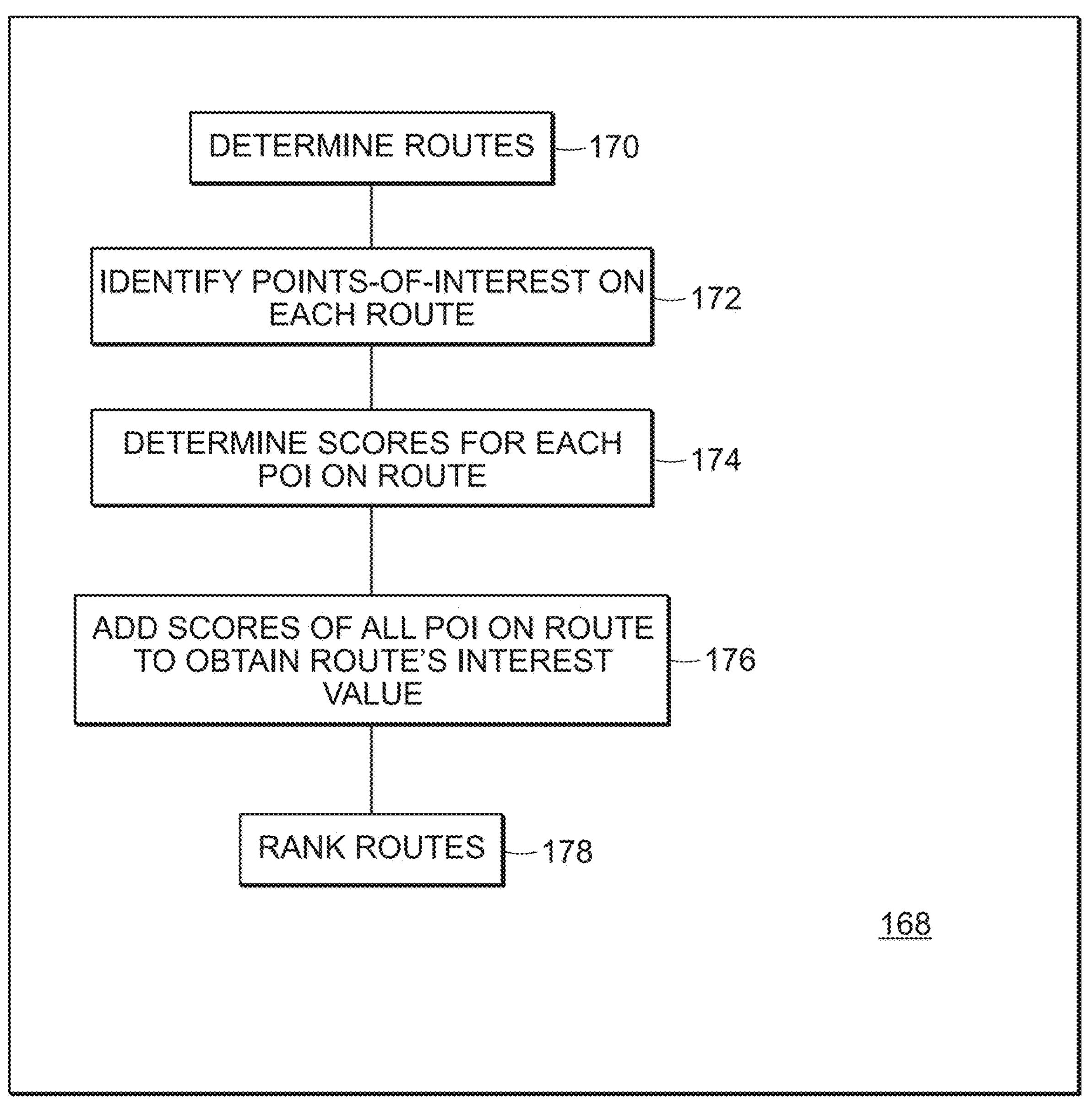
FIG. 13 shows a process for calculating interest values for the tours identified in FIG. 12.

Referring now to FIG. 13, a rating method 168 carried out by the touring application 156 begins by determining the various paths 54 between the origin and the destination (step 170). For each such route, the touring application 156 identifies points-of-interest 88 along that route (step 172) and determines, for each such point-of-interest 88, a score (step 174). Once all the scores for the points-of-interest 88 have been determined, the touring application 156 adds them together to obtain the route's interest value (step 176). It then proceeds to rank them by interest value (step 178) for presentation to the user. In some practices, the touring application 156 excludes those routes that have an interest value below a pre-defined threshold.

Figure 14:
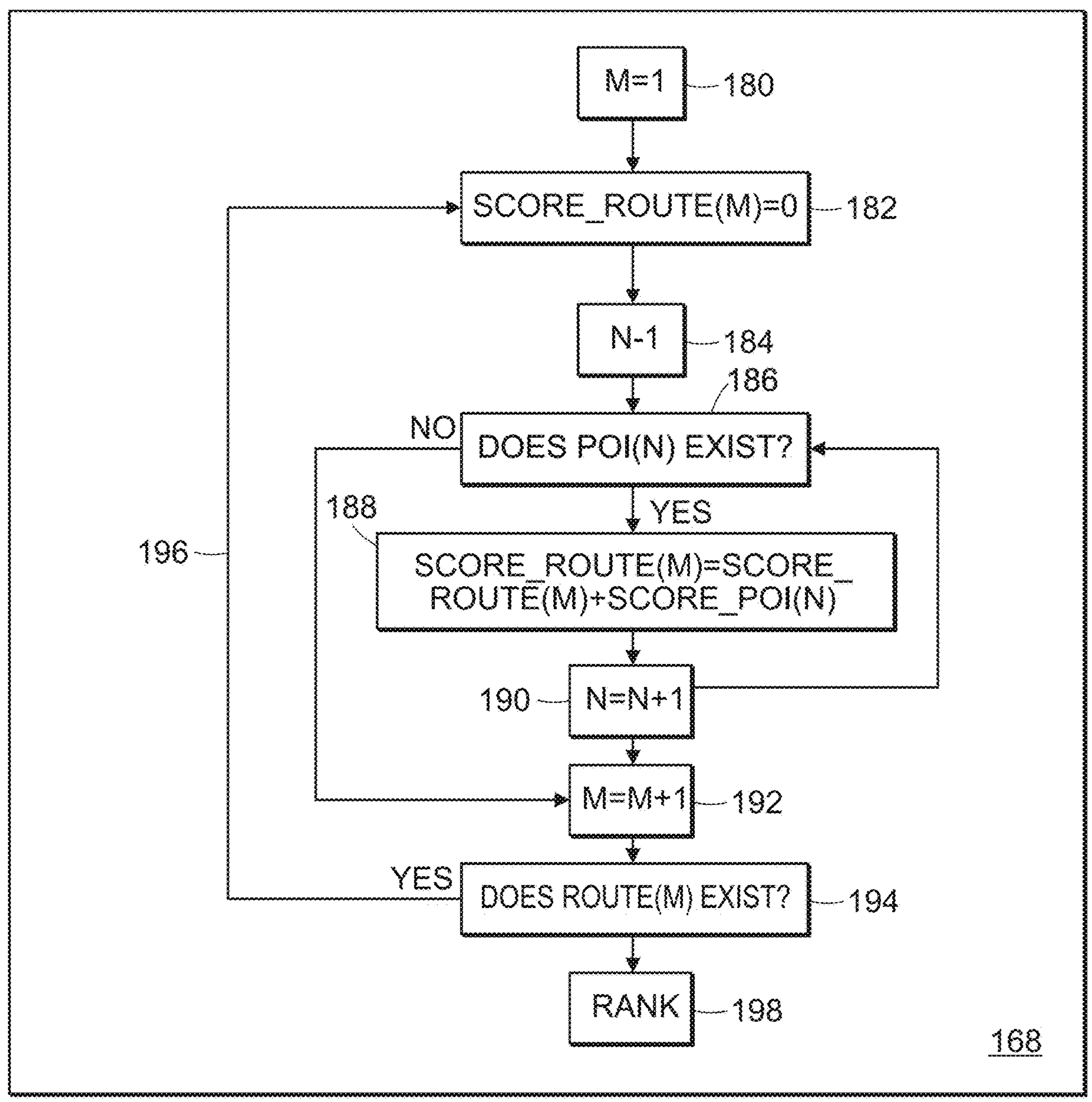
FIG. 14 shows a particular implementation of a process as shown in FIG. 13.

FIG. 14 shows an implementation of the rating method 168 shown in FIG. 13 for calculating interest values for routes. The rating method 168 begins by setting an index to the first route (step 180) and initializing the interest value (step 182). An index is then set to inspect the first element of an array that holds the points-of-interest 88 on the route (step 184). If the first element is empty, the process inspects the next route (step 186). If it is not empty, the process increments the score for that route by the score of the point-of-interest 88 (step 188) and increments the index for the array that holds the points-of-interest 88 (step 190).

If no points-of-interest 88 remain on that route, the index for the routes is incremented (step 192) and a determination is made concerning whether there are any more routes (step 194). If there are, the procedure repeats (step 196). Otherwise, the routes are ranked (step 198).

Whether or not a point-of-interest 88 is considered along the path 54 depends in part on the prominence of the point-of-interest 88 and its distance from the route. For example, a large volcano may be considered to be along the path 54 even though it is dozens of miles from the actual path 54 simply because it is so prominent. In contrast, a sinkhole that is dozens of miles from the path 54 would most likely not be considered along the route because it cannot easily be seen from the path 54.

In some methods, the points-of-interest 88 all have the same score. Other embodiments include assigning different weights to different points-of-interest 88 and summing the weighted points-of-interest 88 along the path 54.

Also, among the embodiments are those that define a threshold interest value before a path 54 can merit identification as a tour 166. This eliminates the need to display paths 54 that have points-of-interest 88 that would not be expected to arouse nearly as much interest as other points-of-interest 88.

Also, among the embodiments are those that place an upper bound on the overall length of the path 54, thereby ensuring that proposed tour 166 does not excessively lengthen the journey between the origin 160 and the destination 48.

Figure 15:
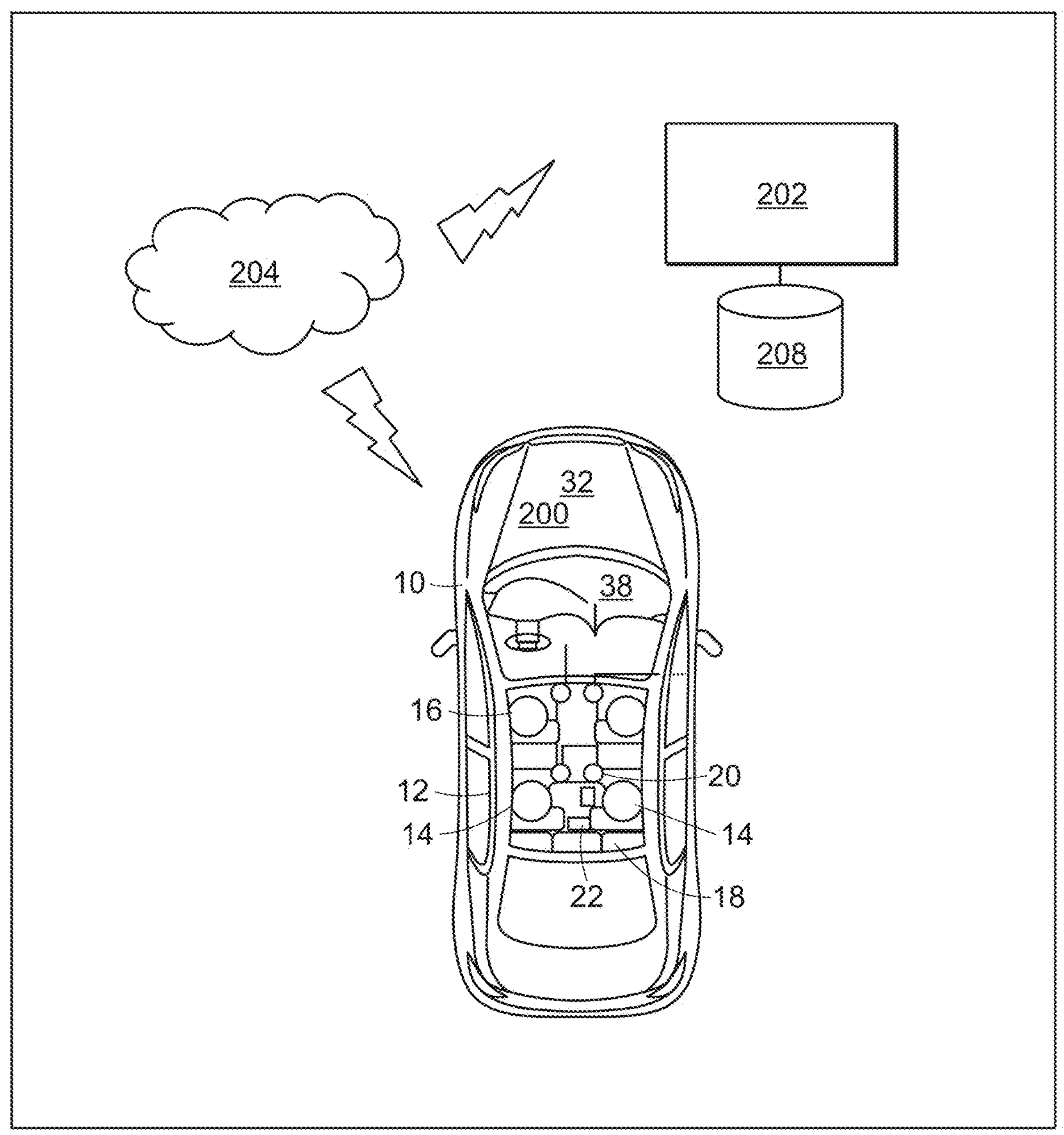
FIG. 15 shows an alternative embodiment in which the infotainment system of FIG. 1 communicates with a remote navigation server.

Referring now to FIG. 15, in some embodiments, the infotainment system 38 connects to a network interface 200 that communicates with a remote navigation server 202 in the cloud 204. The navigation server 202 maintains a remote point-of-interest database 208 that, like the local point-of-interest database 158, provides information concerning points-of-interest 88.

The remote navigation server 202 provides services to a population of vehicles, among which is the illustrated vehicle 10. Among these services is that of answering questions posed by occupants 14 of those vehicles concerning various features that those occupants 14 have encountered in their respective environments.

As an example, the remote navigation server 202 may find that it has received queries from occupants 14 of many vehicles 10 about an otherwise unremarkable landmark. Based on that vehicle's known location and any cues provided by the occupant 14 concerning the landmark of interest, the navigation server 202 infers the identity of this landmark that so many occupants 14 have inquired about. After having retrieve whatever information is available concerning that landmark, the navigation server 202 then communicates that information to the occupants 14 that have inquired.

As a result of having provided such services to a community of vehicles 10, the navigation server 202 is in the unique position of being able to detect a surge in interest in this otherwise unremarkable landmark. Based on such a surge in interest, the navigation server 202 would reasonably infer that this otherwise unremarkable landmark has become, for whatever reason, a legitimate point-of-interest 88. Since the navigation server 202 also maintains the remote point-of-interest database 208, it is able to use this information to update the remote point-of-interest database 208 to include this newly discovered point-of-interest 88 so that it can be included in a tour 166 when the touring application 156 operates in exploratory mode. As a result, it is possible to dynamically create new points-of-interest 88.

Conversely, the navigation server 202 detects a drop in the frequency of inquiries concerning the newly discovered point-of-interest 88. Accordingly, the navigation server 202 infers that this previously unremarkable landmark has, once again, become unremarkable. As such, the navigation server 202 removes it from the remote point-of-interest database 208.

In effect, this landmark has behaved in a manner analogous to a nova. It begins in obscurity. A surge in interest from occupants 14 of many vehicles 10 lifts it out of obscurity. As a result, this landmark becomes a point-of-interest 88 worthy of inclusion in the remote point-of-interest database 208. Then, after some time, the landmark fades back into obscurity.

Unlike the local point-of-interest database 158, the remote point-of-interest database 208 is dynamically updated based on the collective activity of the occupants 14 the aggregate vehicle population. As a result, in those cases when the infotainment system 38 is in communication with the navigation server 202, the navigator 32 will have access to two sources of information concerning points-of-interest 88. The local point-of-interest database 158 represents a static source of points-of-interest 88 and the remote point-of-interest database 208 represents a dynamic source of points-of-interest 88 that is continuously updated.

Figure 16:
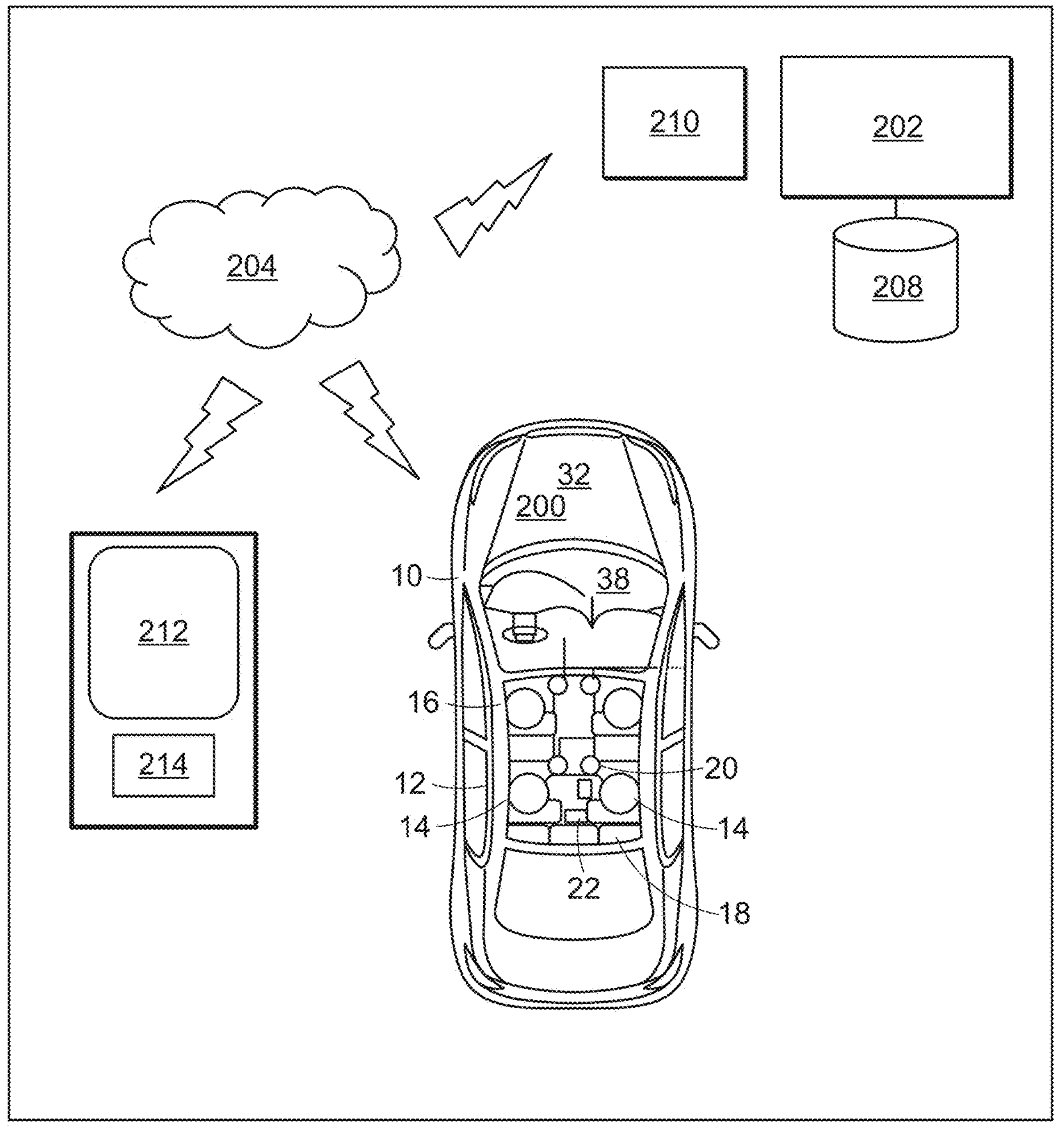
FIG. 16 shows a remote tour-guide that executes concurrently with the tour guide that is part of the application suite in FIG. 3.

Referring now to FIG. 16, in some embodiments, the touring application 156 that operates in guide mode communicates with a touring server 210 via the cloud 204. Under such circumstances, the touring server 208 recognizes that the touring application 156 is one that is being executed within the infotainment system 38. Accordingly, the touring server 210 provides the touring application 156 with information consistent with a tour 166 that is being carried out in a moving vehicle 10.

However, there exist some points-of-interest 88 that the occupant 14 cannot enjoy from the confines of a vehicle 10. For example, in dense urban areas, many points-of-interest 88 abound. Yet, the vehicle 10 becomes a liability rather than an asset. Similarly, there are certain points-of-interest 88 that the vehicle 10 simply cannot reach. These include points-of-interest 88 in wilderness areas that are not accessible by road or points-of-interest 88 that can only be reached by ferry. In such cases, it is convenient for the occupant 14 to continue the tour 166 using a different mode of transportation. Examples of different modes include touring on foot, on a bicycle, on a boat, or via a suitable pack animal such as a horse or mule.

Of course, having left the vehicle 10 behind, the occupant 14 is technically no longer really an "occupant." However, for convenience of exposition, and to avoid having to introduce a new noun, the occupant 14 will continue to be referred to as such even after having left the vehicle 10.

To overcome this difficulty of no longer being in the vehicle 10, and hence no longer being able to use the infotainment system 38, it is useful for the occupant 14 to carry a portable device 212 that executes a second touring application 214. An example of a portable device 212 is a smart phone, as shown in FIG. 16.

This second touring application 214 operates concurrently with the touring application 156 from the application suite 50. For convenience of exposition, the touring application 156 from the application suite 50 will now be referred to as the "first touring-application 156" to distinguish it from the "second touring-application 214" that executes on the portable device 212. Both the first and second touring applications 156, 214 are in communication with both the touring server 210 and the navigation server 202 and thus form, as a whole, a distributed touring system.

Since the navigation server 202 receives position information at known times, it is able to infer velocity of both the vehicle 10 and the portable device 212. Accordingly, the navigation server 202 is able to detect that the vehicle 10 has stopped. In addition, the navigation server 202 is also able to detect motion of the portable device 212 using the smart phone's own navigation system. As a result, it is possible for the navigation server 202 to detect zero velocity for the vehicle 10 and a non-zero velocity for the portable device 212. Based on having detected such a systematic difference in velocities, the navigation server 202 infers that whoever is carrying the portable device 212 is likely to be moving independently of the vehicle 10 using a different mode of transportation. Accordingly, the navigation server 202 provides this information to the touring server 210.

Other embodiments rely on different information to infer that the tour 166 is to be continued on the portable device 212. Examples of such different information include detecting that the vehicle 10 has been turned off and detecting that a wireless link between the portable device 212 and the head unit 24 has been interrupted.

Based on this information, the touring server 210 automatically adjusts the tour 166 so as to be consistent with the velocity of the portable device 212. For example, if the velocity of the portable device 212 indicates a walking pace, the touring server 210 switches to directions and narrative that are geared specifically for an occupant 14 who is on foot. Should the touring server 210 receive information from the navigation server 202 indicating that the average velocity of the portable device 212 has increased to that associated with a bicycle, the touring server 210 then switches to directions and narrative that are geared specifically for an occupant 14 who is on a bicycle.

Eventually, the occupant 14 will return to the vehicle 10. Should the touring server 210 receive information from the navigation server 202 indicating that the average velocity of the portable device 212 has increased to that consistent with a motor vehicle 10, the touring server 210 then switches to directions and narrative that are geared specifically for an occupant 14 who is in a motor vehicle 10. Concurrently, the first tour-guide 156 takes over control from the second tour-guide 214. As a result, the tour 166 continues, but using the first tour-guide 156.

Accordingly, the touring server 210 and the navigation server 202 cooperate to infer which of the first and second tour-guides 156, 214 is in control of the tour 166 and to switch seamlessly between the first and second tour-guides 156, 214.

It is to be understood that the foregoing description is intended to illustrate and not to limit the scope of the invention, which is defined by the scope of the appended claims. Other embodiments are within the scope of the following claims.

What is claimed is:

1. A method for using an automotive assistant to use natural language to communicate information to an occupant of a vehicle, said method comprising:

receiving first and second outputs from respective first and second applications, said first and second outputs comprising first text and second text, respectively;

using a natural-language processor, generating hybrid text using said first text and said second text, wherein said hybrid text comprises information to be presented to said occupant; and communicating said hybrid text to said user of said automotive assistant, wherein communicating said hybrid text to said occupant comprises processing said hybrid text and wherein processing said hybrid text comprises using a text-to-speech converter to produce hybrid audio, wherein said method further comprises using a loudspeaker to communicate said hybrid audio to said occupant, wherein said first application is a navigation application and said second application is a touring application, wherein said first application produces said first text independently of said second application producing said second text, and wherein generating said hybrid text using said first text and said second text comprises determining an insertion point within said first text and inserting said second text at said insertion point and wherein determining said insertion point comprises determining said grammatical structure of said first text.

2. The method of claim 1, wherein generating said hybrid text using said first text and said second text comprises incorporating into said hybrid text at least some text that is missing from both said first text and said second text and wherein said hybrid text represents a combination of a meaning of said first text and a meaning of said second text.

3. The method of claim 1, wherein generating said hybrid text using said first text and said second text comprises generating a summary of said first text and using said summary in said hybrid text.

4. The method of claim 1, wherein said first output comprises a first constraint, wherein said second output comprises a second constraint, wherein generating said hybrid text comprises generating said hybrid text so as to conform to said first constraint and to said second constraint, wherein said first constraint and said second constraint are selected from the group consisting of a visibility constraint and an interference constraint.

5. An apparatus comprising a navigator that provides location information, said location information comprising information that is indicative of a geographic location of said vehicle, an automotive processing unit that is integrated into a vehicle having a cabin, and a loudspeaker that radiates sound into said cabin, and plural microphones disposed at seats in said vehicle, said automotive processing unit comprising said navigator, a processor, an application suite comprising one or more spatially-cognizant applications, wherein said spatially-cognizant applications provide output that depends at least in part on location of said vehicle, an automotive assistant that is configured to execute one or more of said spatially-cognizant applications, an infotainment system that comprises said application suite, a tour-guide application, said tour-guide application being among said spatially-cognizant applications, a speech interface that is configured:

to receive a navigation announcement from said navigator and a touring announcement from said tour-guide application, to use said processor to combine content from said navigation announcement and content from said touring announcement to form a hybrid announcement, and to cause said hybrid announcement to be made audible in said cabin through said loudspeaker, said hybrid announcement comprising content from said touring announcement and content from said navigation announcement, said processor being a natural-language processor that is a constituent of said speech interface.

6. The apparatus of claim 5, wherein first and second announcements are selected from said group consisting of said navigation announcement and said touring announcement and wherein said processor identifies, based on grammatical structure of said first announcement, an insertion point for inserting content from said second announcement into said first announcement to form said hybrid announcement.

7. The apparatus of claim 5, wherein first and second announcements are selected from the group consisting of said navigation announcement and said touring announcement, wherein said processor identifies a sentence in said second announcement, said sentence having an end, and wherein said natural-language processor is configured to insert content from said first announcement at said end to form said hybrid announcement.

8. The apparatus of claim 5, wherein first and second announcements are selected from said group consisting of said navigation announcement and said touring announcement and wherein said processor is configured to insert said second announcement between first and second sentences in said first announcement, thereby forming said hybrid announcement.

9. The apparatus of claim 5, wherein first and second announcements are selected from said group consisting of said navigation announcement and said touring announcement, wherein said hybrid announcement includes content from said first and second announcements, wherein said processor that identifies a sentence in said second announcement, selects, as an insertion point, a beginning of said sentence, and inserts content from said first announcement into said second announcement at said insertion point to thereby form said hybrid announcement.

10. The apparatus of claim 5, wherein said processor is configured to interleave content from said touring announcement and said navigation announcement to form said hybrid announcement, whereby said hybrid announcement includes content from both announcements.

11. The apparatus of claim 5, wherein said processor is configured to form said hybrid announcement by inserting a phrase between said navigation announcement and said touring announcement.

12. The apparatus of claim 5, wherein said speech interface causes insertion of a syntactic cue between said navigation announcement and said touring announcement to form said hybrid announcement.

13. The apparatus of claim 5, wherein said processor is configured to combine touring content from said touring announcement and navigation content from said navigation announcement to form said hybrid announcement and to deliver said touring content and said navigation content in said hybrid announcement using different voices.

14. The apparatus of claim 5, wherein said speech interface comprises a summarizer and wherein said summarizer is configured to receive said touring announcement and to generate a summarized version thereof, wherein said summarized version is interleaved into said navigation announcement to form said hybrid announcement.

15. The apparatus of claim 5, wherein said navigation announcement and said touring announcement comprise corresponding first and second sentences and wherein said hybrid announcement comprises a third sentence that incorporates content from said first and second sentences.

16. An apparatus for causing a natural language hybrid announcement to be spoken within a vehicle having an automotive assistant that is configured to execute one or more applications, said applications being spatially-cognizant applications, each of which provides an announcement that is based at least in part on a location of said vehicle, said applications comprising first and second applications, said apparatus comprising:

a navigator that provides location information, said location information comprising information that is indicative of a geographic location of said vehicle, an automotive processing unit that is integrated into a cabin of the vehicle, and a loudspeaker that radiates sound into said cabin, and plural microphones disposed at seats in said vehicle, said automotive processing unit comprising said navigator, a processor, an application suite comprising the spatially-cognizant applications, an infotainment system, a tour-guide application, said tour-guide application being among said spatially-cognizant applications, and a speech interface that is configured for:

receiving first and second announcements from said first and second applications, respectively, said first announcement comprising text, forming a hybrid announcement based on said first and second announcements, said hybrid announcement being a natural-language announcement, causing said hybrid announcement to be output via the said loudspeaker into the said cabin of said vehicle at a time and location that is constrained by said first and second announcements.

* * * * *